US008939679B2

(12) United States Patent
Andrews et al.

(10) Patent No.: US 8,939,679 B2
(45) Date of Patent: Jan. 27, 2015

(54) MOBILE PIPE LINING APPARATUS

(71) Applicant: Sekisui Chemical Co., Ltd., Osaka-shi, Osaka (JP)

(72) Inventors: Kevin Andrews, Atlanta, GA (US); Hiroshi Sugahara, Watertown, CT (US)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/684,142

(22) Filed: Nov. 21, 2012

(65) Prior Publication Data
US 2013/0126028 A1 May 23, 2013

Related U.S. Application Data

(60) Provisional application No. 61/562,693, filed on Nov. 22, 2011.

(51) Int. Cl.
*F16L 55/18* (2006.01)
*F16L 55/165* (2006.01)

(52) U.S. Cl.
CPC ............ *F16L 55/18* (2013.01); *F16L 55/1655* (2013.01)
USPC ...................................... 405/184.2

(58) Field of Classification Search
USPC ............................................ 405/150.1, 184.2
See application file for complete search history.

(56) References Cited

U.S. PATENT DOCUMENTS

| | | | | |
|---|---|---|---|---|
| 2,996,085 A | * | 8/1961 | Matheny | 140/2 |
| 3,508,317 A | * | 4/1970 | Hill et al. | 405/150.1 |
| 5,076,729 A | * | 12/1991 | Grotenhofer | 405/146 |
| 5,101,863 A | * | 4/1992 | Fujii et al. | 138/98 |
| 5,171,105 A | * | 12/1992 | Grotenhofer | 405/146 |

* cited by examiner

Primary Examiner — Tara M. Pinnock
(74) Attorney, Agent, or Firm — Cheng Law Group, PLLC

(57) ABSTRACT

The present invention relates to a mobile pipe lining apparatus for installing strip lining material into a host pipe. The apparatus comprises a lining machine for receiving a feed of strip lining material and placing it in a host pipe to form a new pipe lining, a carriage attached to the lining machine such that the full weight of the lining machine is borne by the carriage, and adjusting means for adjusting a position of the lining machine relative to the carriage.

18 Claims, 23 Drawing Sheets

FIG. 4
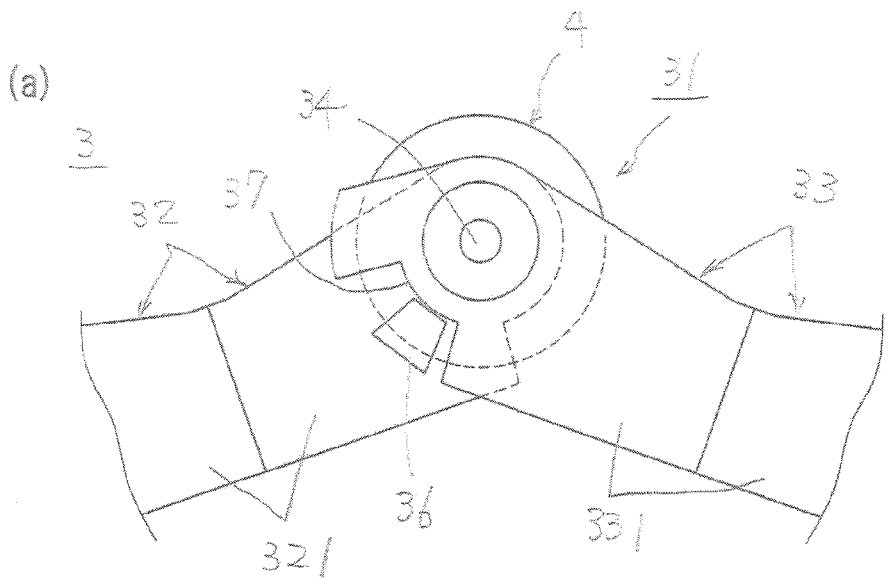
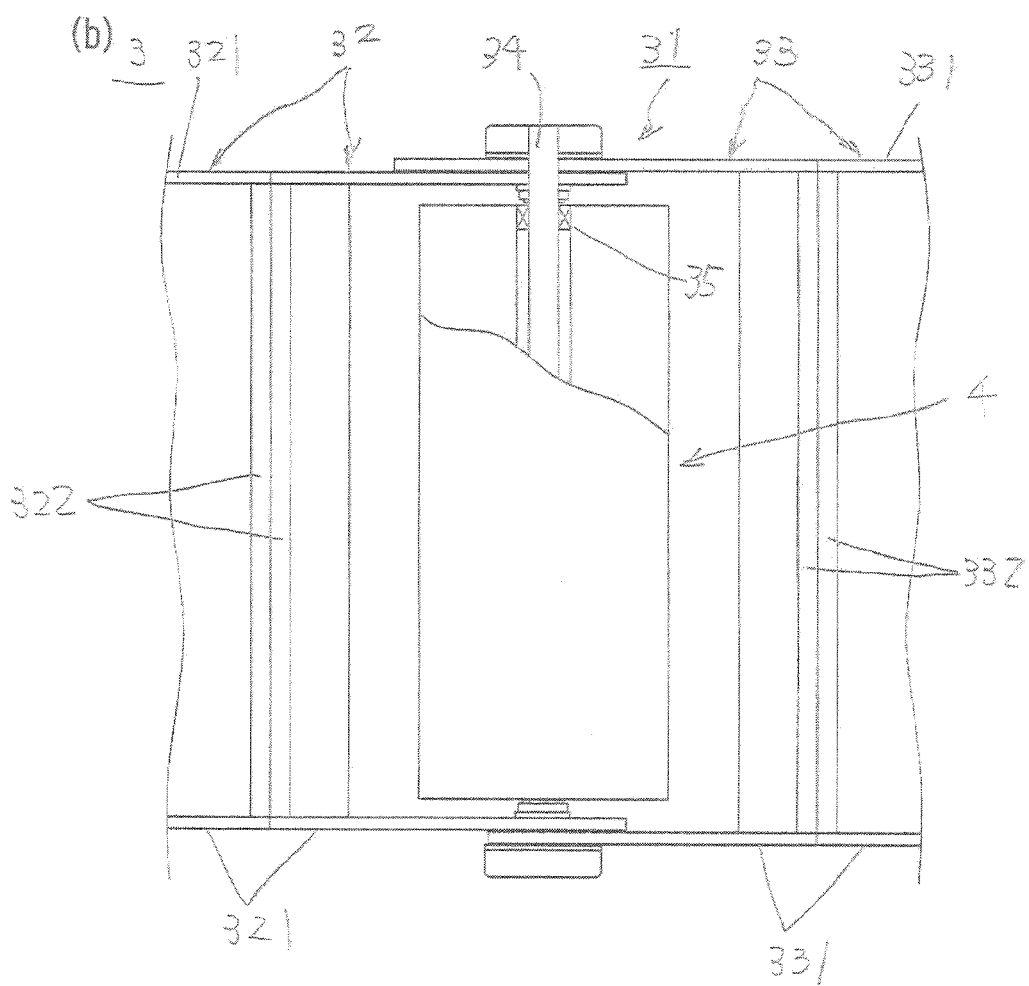

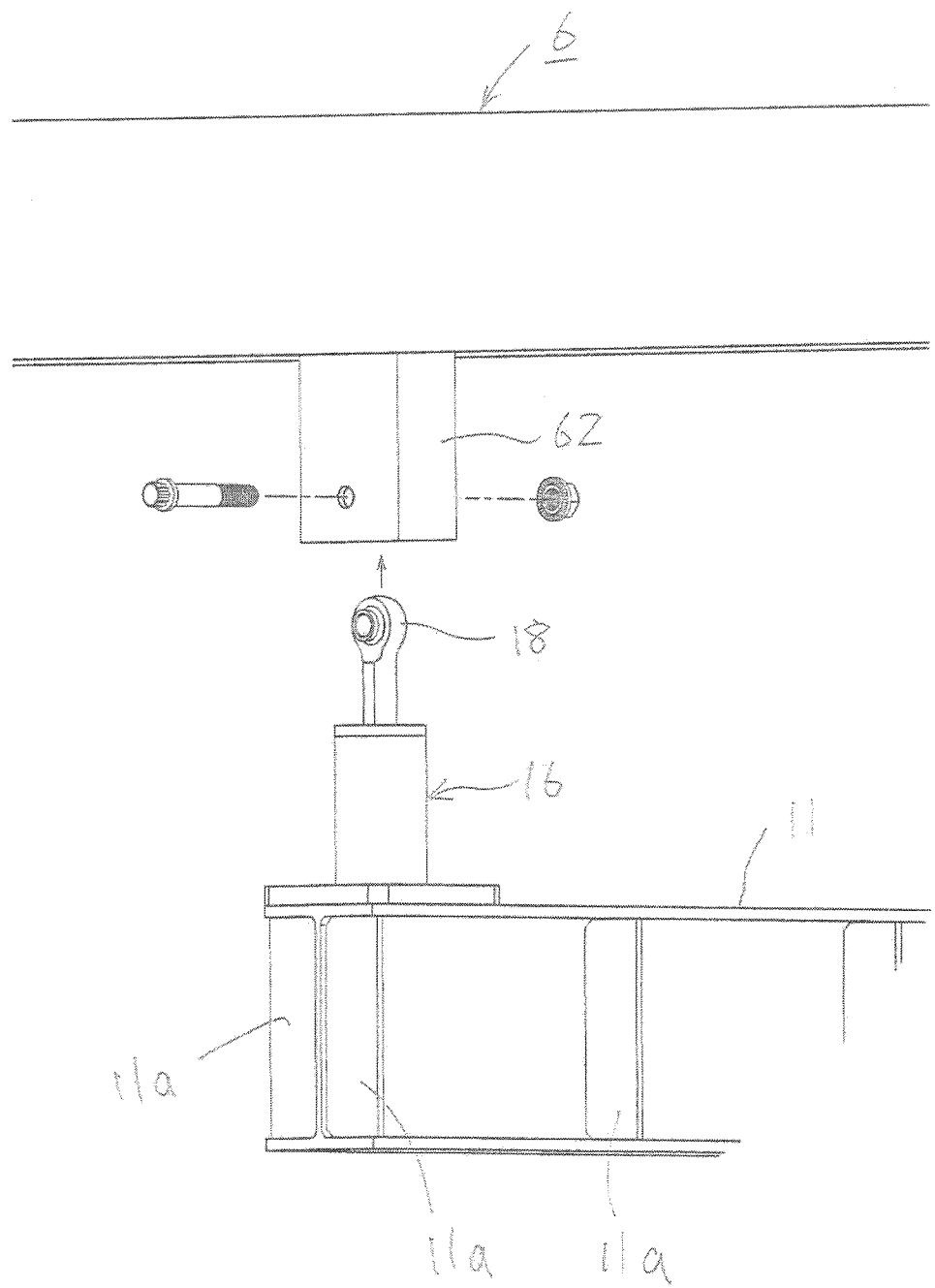

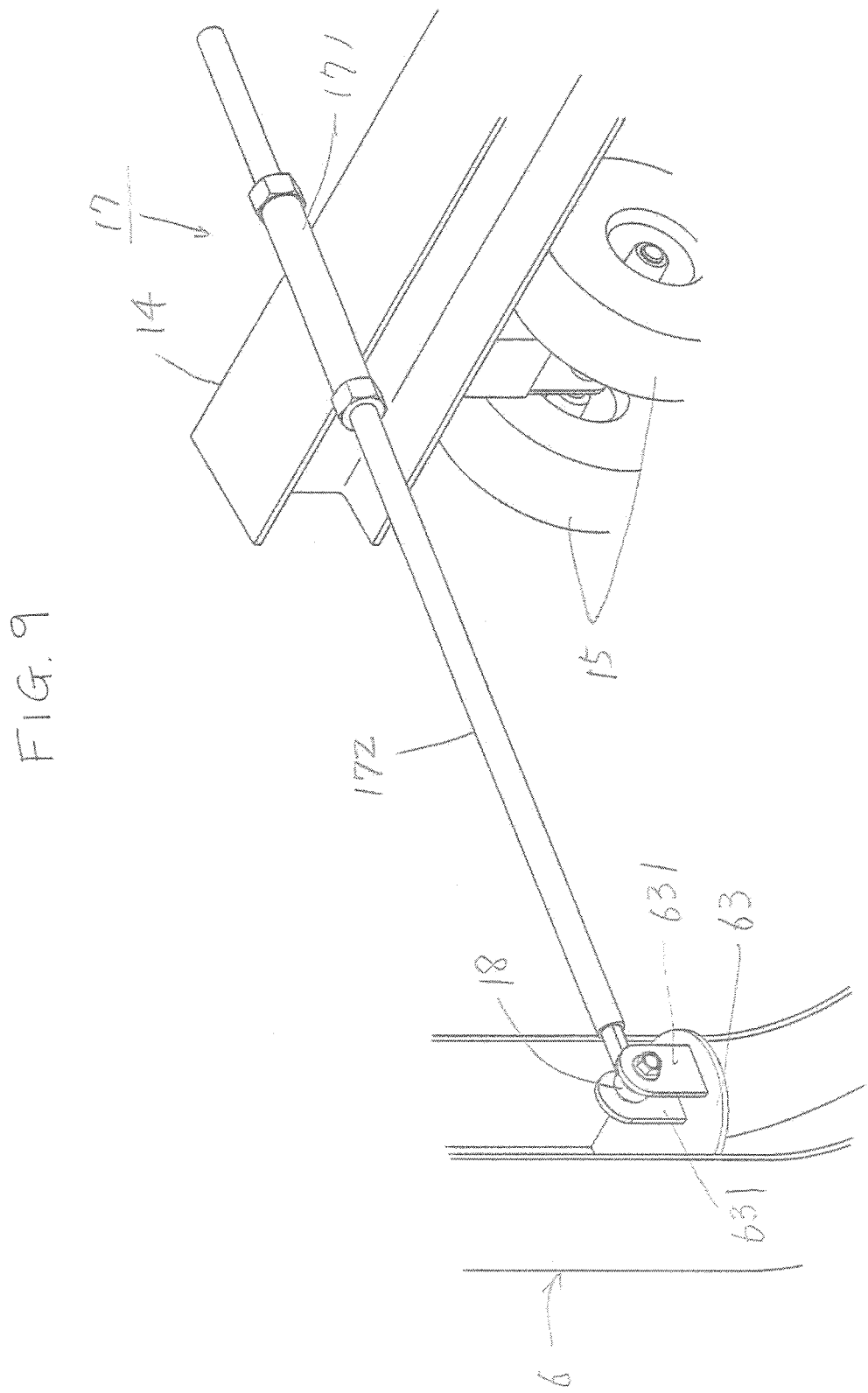

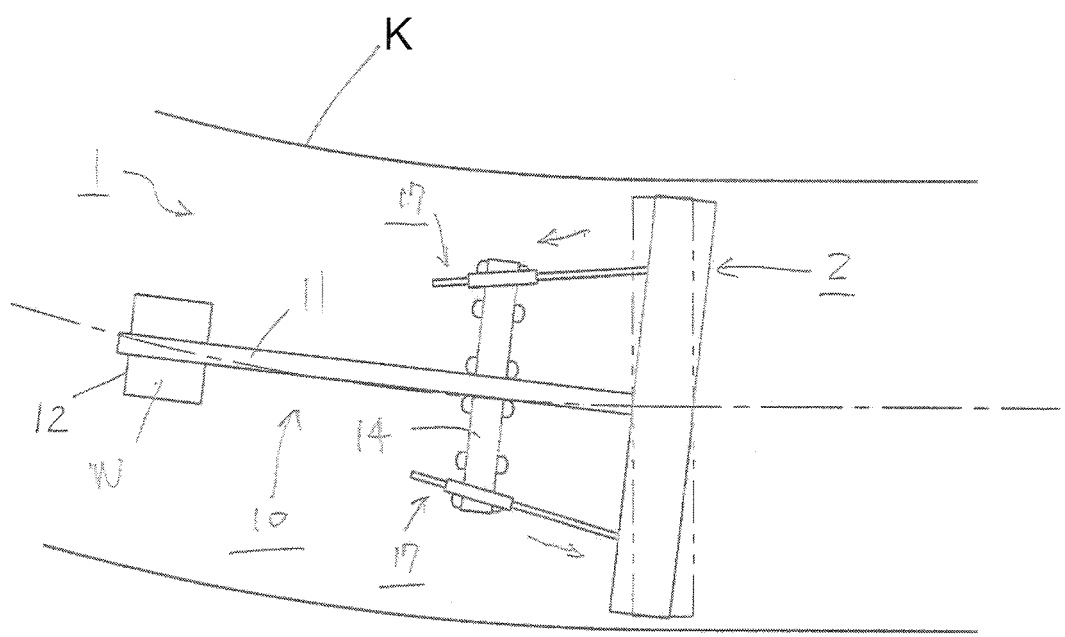

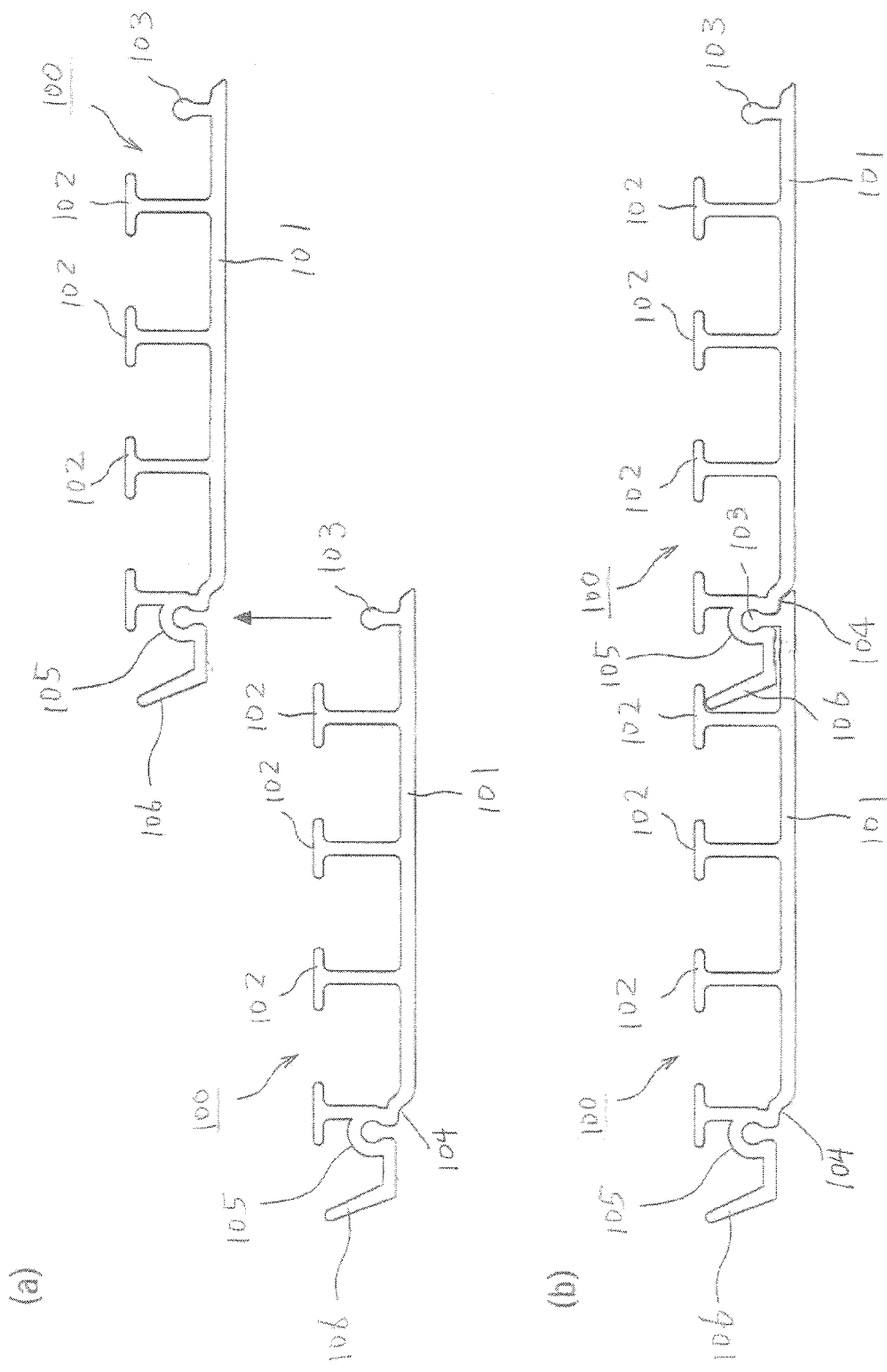

FIG. 14
(a)
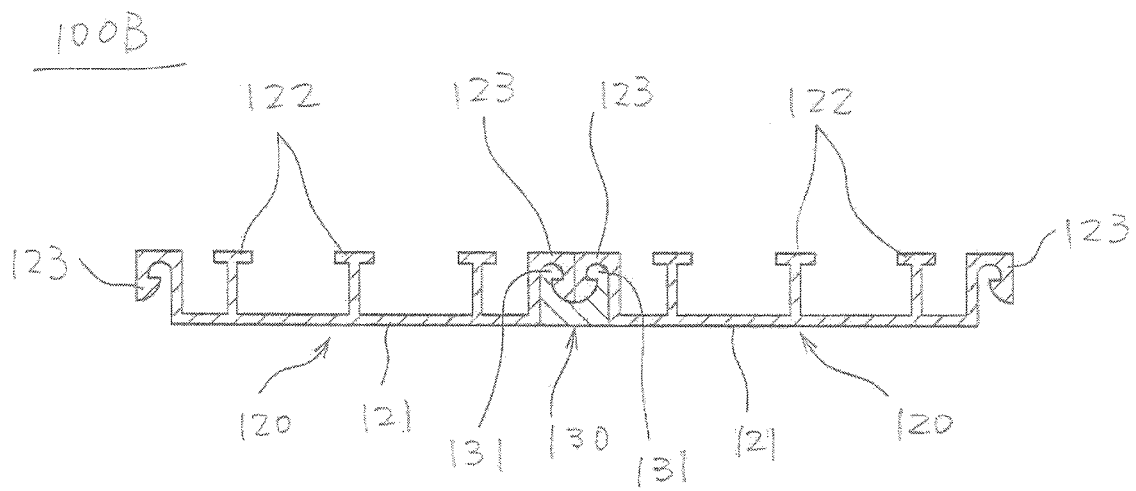
(b)
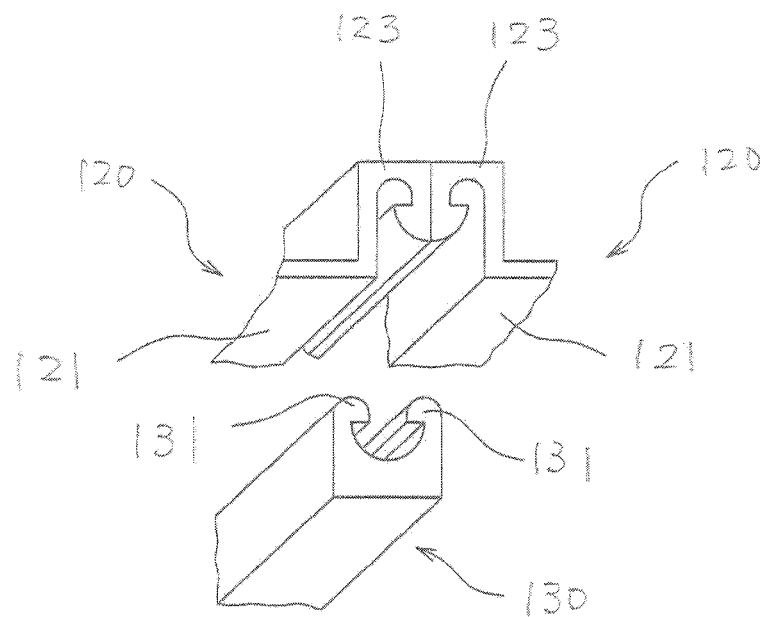

MOBILE PIPE LINING APPARATUS

CROSS-REFERENCE TO RELATED APPLICATION

This application claims priority from and the benefit of provisional application Ser. No. 61/562,693 filed on Nov. 22, 2011, titled Pipe Lining Machine and Method of Lining, which is hereby incorporated by reference for all purposes as if fully set forth herein.

BACKGROUND OF THE INVENTION

1. Field of the Invention

The present invention relates to mobile pipe lining apparatuses and more specifically, to an apparatus for installing strip lining material into a host pipe.

2. Discussion of the Background

Over time, pipes, particularly larger buried pipes, such as sewer lines, will naturally deteriorate. Replacing them can be extraordinarily expensive. Instead, techniques have been developed to reline the interior of the pipe so that it does not have to be dug up and replaced. Machines devised for sewer pipe relining are described in U.S. Pat. Nos. 6,663,319; 5,954,903; 6,089,279 and 7,186,060 (incorporated herein by reference). Generally, in tubular culverts, a self-propelled pipe manufacturing apparatus with a revolving motion is used to form a tubular body by spirally winding and locking together a continuously supplied elongated strip lining material into the interior of the old pipe to form a new lining.

However, these pipe manufacturing apparatuses cannot effectively keep a stable/constant center line movement as the lining machine walks down the pipe because the lining machine cannot adapt to the variable contours (bends) of different sewer pipes, and obstacles such as deformities in the pipe wall. Therefore, it is difficult to create a consistent pipe lining in a curved sewer pipe or pipe with variable contours. Moreover, the force of the feed material being fed into the lining machine causes the lining machine to walk in direction of the forming motion and away from centerline. This can cause liner riblocks of the strip lining material to pull apart, and/or get caught on the inner surface of the pipe being restored, among other issues.

In addition, larger pipes necessitate a larger, heavier lining machine, and the weight of the lining machine can cause damage to the plastic strip liner (cracking, locks pulling apart, etc.), the sewer pipe, as well as damage to the weight bearing components of the lining machine itself. Therefore, as pipe diameters increase, it becomes impractical to drive the strip lining material from the end of the pipe to the relining site as the distance increases. In other words, "pushing" the relining down the pipe becomes impossible as the weight increases. The strip lining material's own weight becomes a problem as does the frictional interaction with the pipe, among other issues.

SUMMARY OF THE INVENTION

It is an object of the present invention to provide an angularly adjustable lining machine attached to a carriage to accomplish movement along a stable centerline regardless of pipe conditions to ensure the formation of a structurally reliable and consistently shaped new pipe lining.

Another object of the present invention is to provide a lining machine that utilizes a central hub having a swivel unit to allow for an untwisted/untangled power line supply.

The mobile pipe lining apparatus for installing strip lining material into a host pipe of the present invention comprises a lining machine for receiving a feed of strip lining material and placing it in a host pipe to form a new pipe lining; a carriage attached to the lining machine such that at least a portion of the weight of the lining machine is borne by the carriage; and adjusting means for adjusting a position of the lining machine relative to the carriage.

The adjusting means may adjust a lean angle, turn angle, and/or the height of the lining machine relative to the carriage.

The carriage may further comprise a weight holder for holding weighted objects to counterbalance the weight of the lining machine. The carriage may further comprise a weight distributor for distributing the weight of the lining machine over a defined surface area sufficient to prevent damage to the new pipe lining. The weight distributor may comprise a set of wheels, and may be configured as a pivot point on which the weight of the lining machine and the weight of the weighted objects are counterbalanced, allowing additional control over the orientation of the lining machine based on adjustment of weight in the weight holder.

The lining machine may be generally rectangular in shape or generally circular in shape. When the lining machine is generally circular in shape, it may further comprise a hub rotatably attached to the carriage and a swivel unit in the hub. In addition, the apparatus may further comprise power lines for powering the operation of one or more components of the lining machine, the power lines passing through the swivel unit and the swivel unit remaining in a relatively static position during rotation of the hub.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4(*a*) shows a connection between inner and outer links of a forming frame and FIG. 4(*b*) is a top view of a forming frame.

FIG. 8 is a side view showing a connection between a lining machine and a carriage.

FIG. 9 is a side view showing an adjustable stabilizer bar.

FIG. 10(*b*) is a schematic view of a pipe lining installation system.

FIG. 11 is a top view of a mobile lining apparatus in a curving pipe.

FIG. 12(*a*) is an end elevation showing how strip lining material is interlocked, and FIG. 12(*b*) is an end elevation showing the interlocked strip lining material.

FIG. 14(a) is a sectional drawing of a strip lining material, and FIG. 14(b) is a perspective diagram of a junction and a connector.

DETAILED DESCRIPTION OF THE ILLUSTRATED EMBODIMENTS

Figure 1:
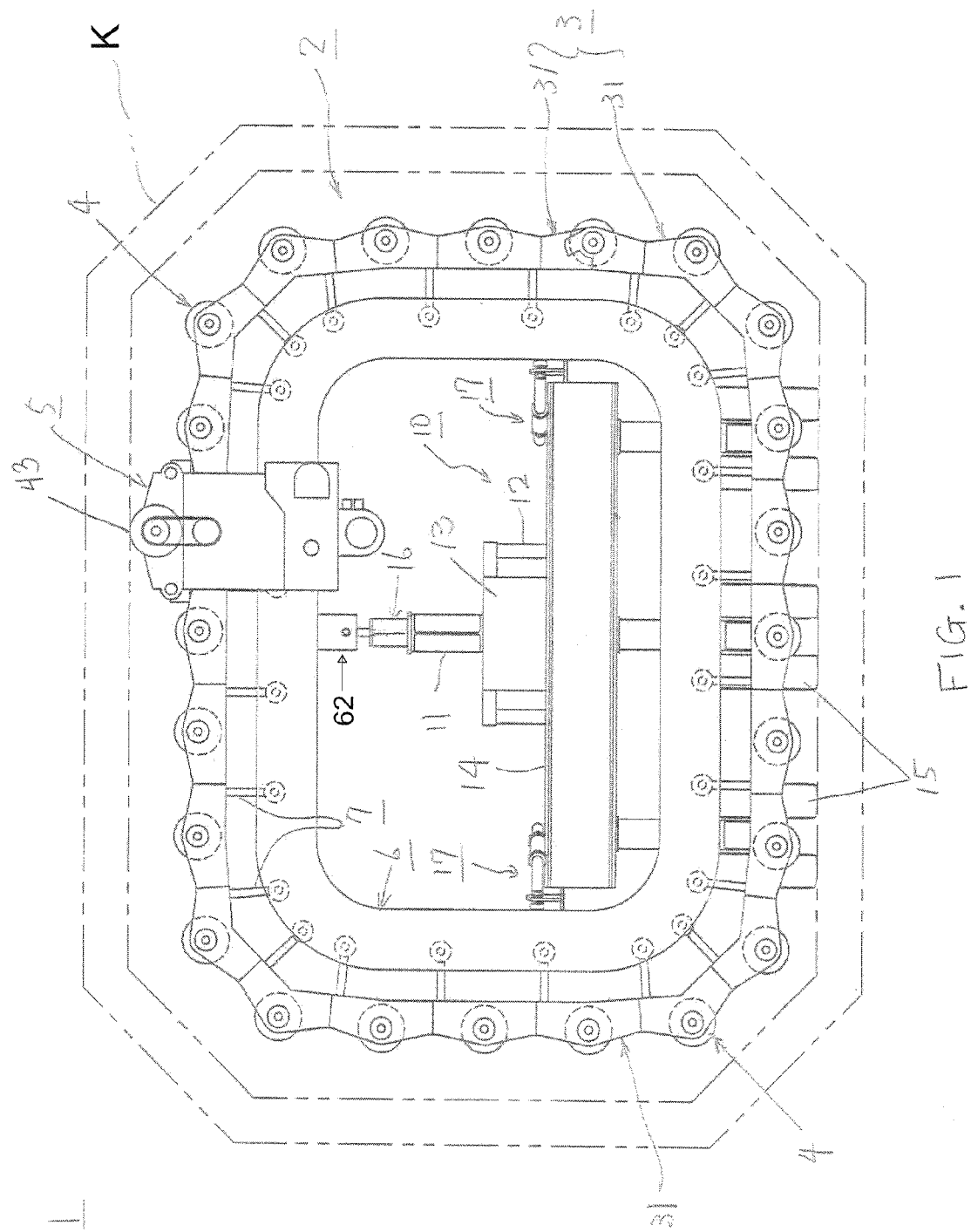
FIG. 1 is a front view of a pipe lining apparatus for installing strip lining material into a host pipe.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 10A:
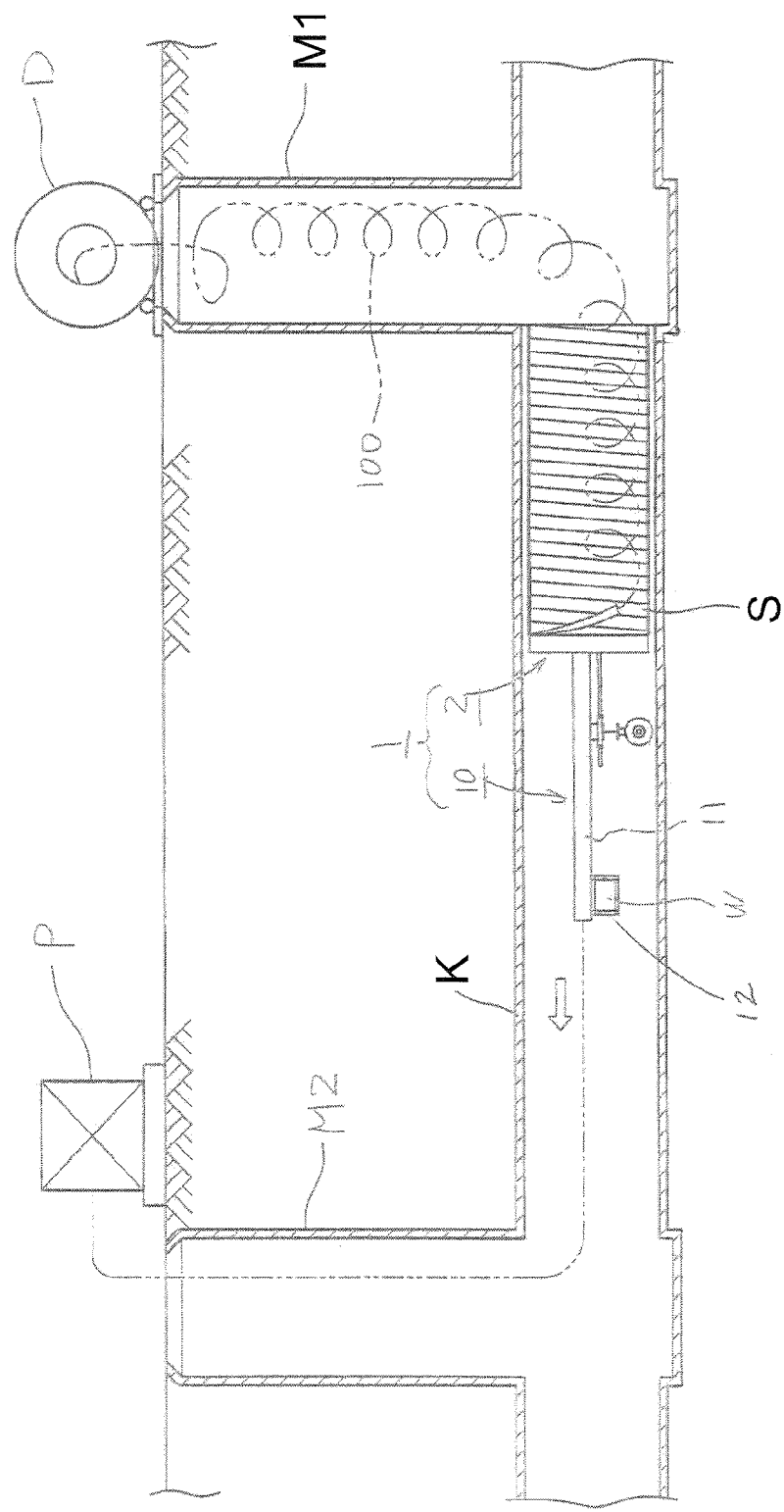
FIG. 10(*a*) is a schematic view of a pipe lining installation system.
Figure 10B:
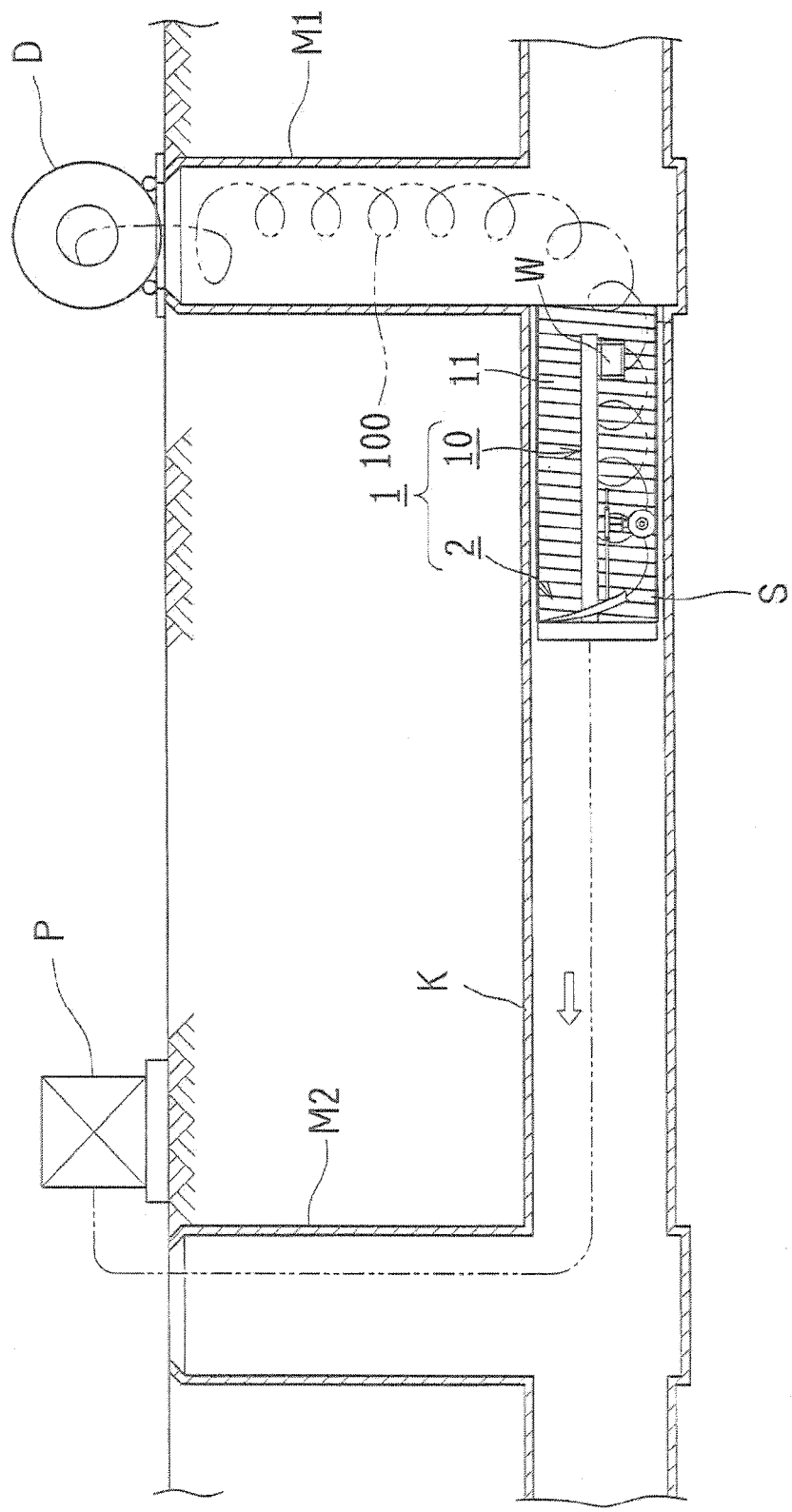

Each of FIGS. 10(a) and 10(b) shows a schematic view of an installation system and method thereof. Pipes can be relined by spirally winding a strip lining material of an elongated sheet-form body into the inside surface of an existing pipe. The strip lining material 100 is wound around the forming frame of a lining machine 2, and a lining pipe S is formed while being forcibly folded inward utilizing the flexibility of the forming frame. Furthermore, a back-filling material may be injected into the inward-folded part.

Manholes M1 and M2 are arranged in the underground damaged pipe K. The damaged pipe K has access portals or manholes that are typically covered when not in use. A pair of manholes, including a downstream manhole M1 and the upstream manhole M2, are preferably used but other access points can be used or created. The damaged pipe K between manhole M1 and manhole M2 is the pipe renovation construction length. The renovation construction method of the underground damaged pipe K forms the lining pipe S in the underground damaged pipe K by utilizing manholes M1 and M2.

The mobile pipe lining apparatus 1 is placed in or assembled in the pipe K. The direction of travel of the mobile pipe lining apparatus 1 is shown by the arrows in FIGS. 10(a) and 10(b). As shown in FIG. 10(a), the apparatus may be arranged such that the carriage 10 leads when the mobile pipe lining apparatus 1 moves within the damaged pipe K. Alternatively, as shown in FIG. 10(b), the apparatus may be arranged such that the lining machine 2 leads when the mobile pipe lining apparatus 1 moves within the damaged pipe K. That is, either directionality and movement of the pipe lining apparatus 1 is possible. A supply strip of lining material 100 is preferably supplied to the lining machine 2. A portion of the supply may be optionally respooled on the mobile pipe lining apparatus 1 which may include a support for local spooling.

The lining pipe S is produced towards the downstream manhole M2 from the upstream manhole M1. As shown in FIGS. 10(a) and (b), in the underground damaged pipe K requiring renovation, the lining machine 2 and the carriage 10 of the mobile pipe lining apparatus 1 are positioned adjacent to the upstream manhole M1. A drum D with a turntable on which the lining material 100 (or lining material 100A or 100B) was wound is positioned above ground adjacent to the upstream manhole M1. A pump unit P, for example a hydraulic pump unit, is installed above ground adjacent to the downstream manhole M2.

Figure 16:
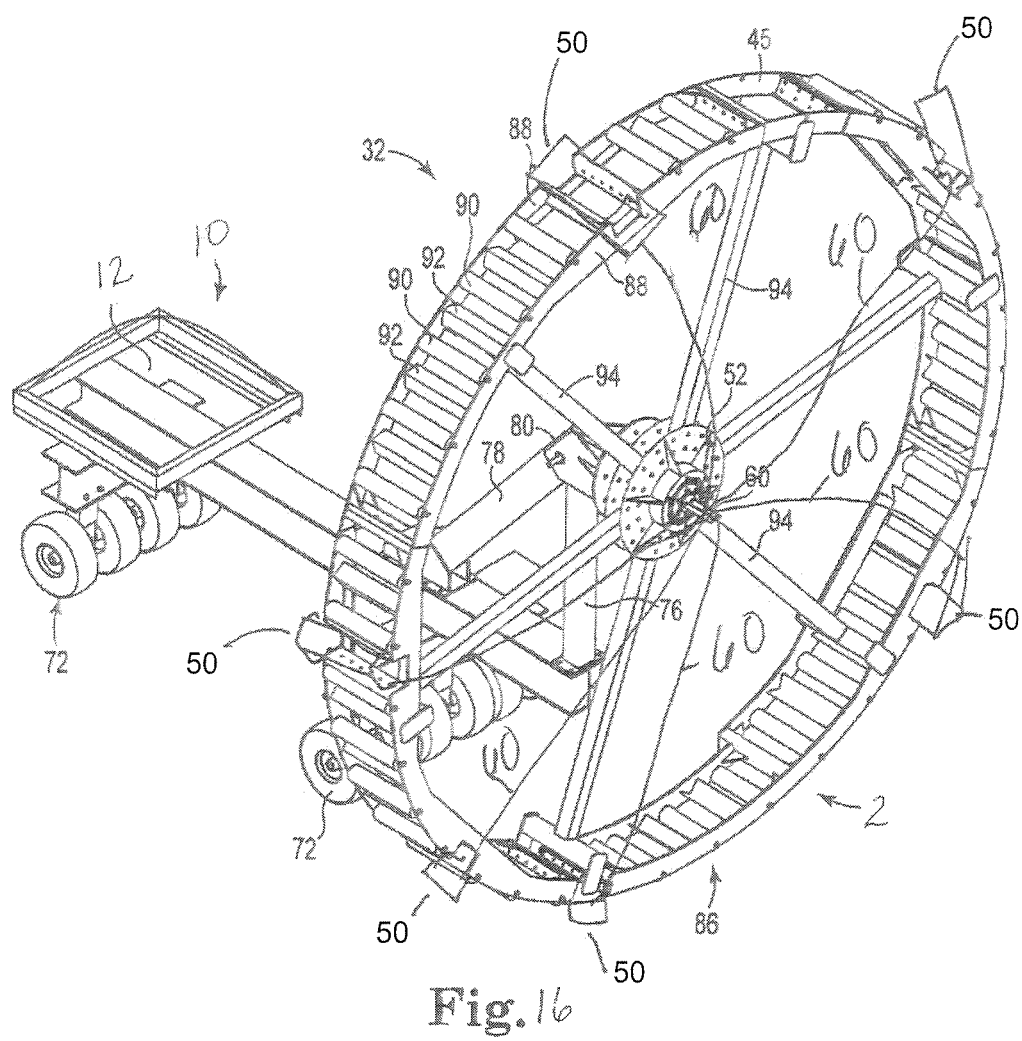
FIG. 16 is a perspective view of the mobile lining apparatus shown in FIG. 15.
Figure 17:
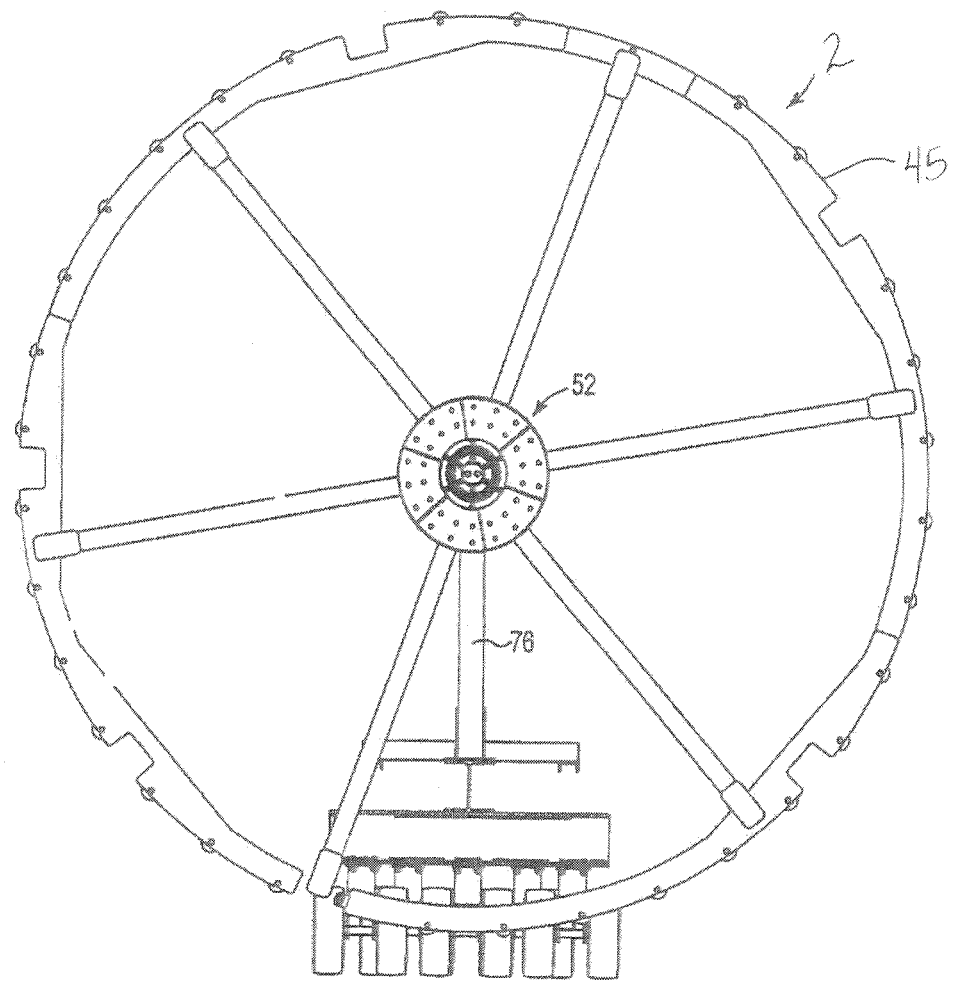
FIG. 17 is a rear plan view of the mobile lining apparatus shown in FIG. 15.
Figure 18:
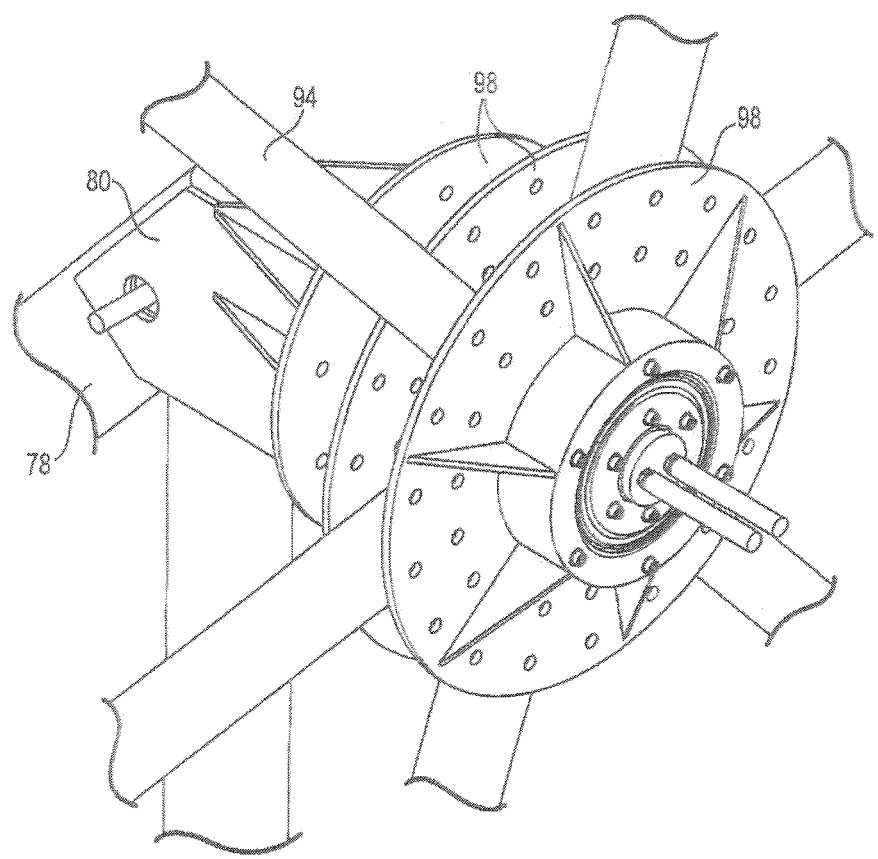
FIG. 18 is a perspective view of a hub.
Figure 19:
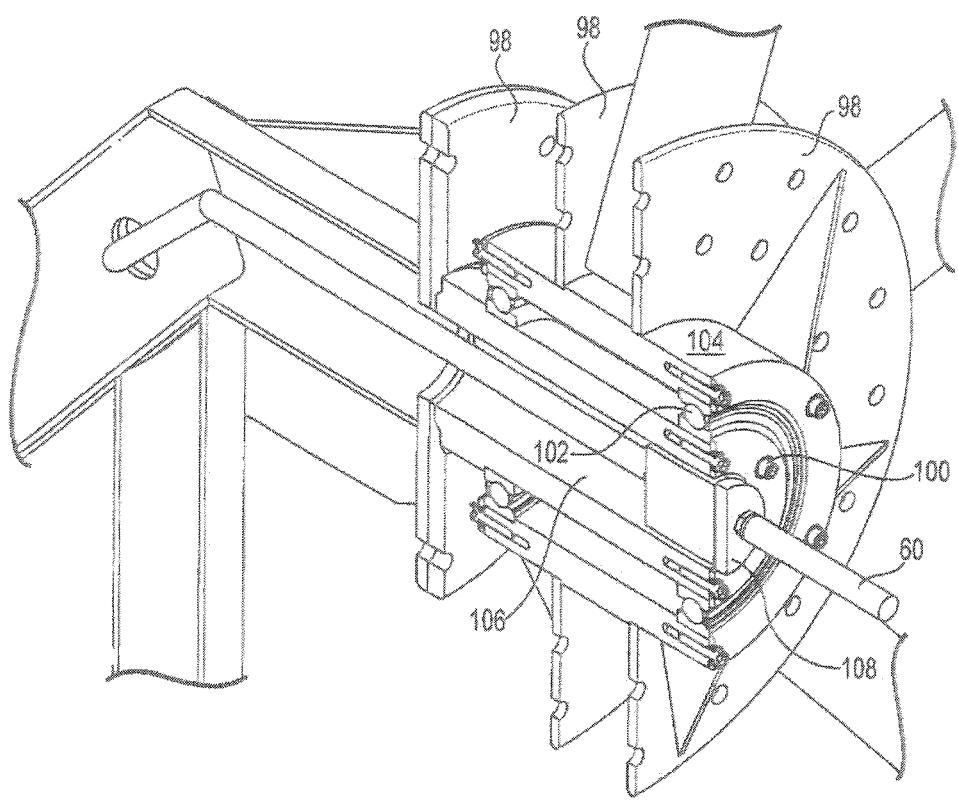
FIG. 19 is a perspective view of the hub in FIG. 18 with portions broken away.
Figure 20:
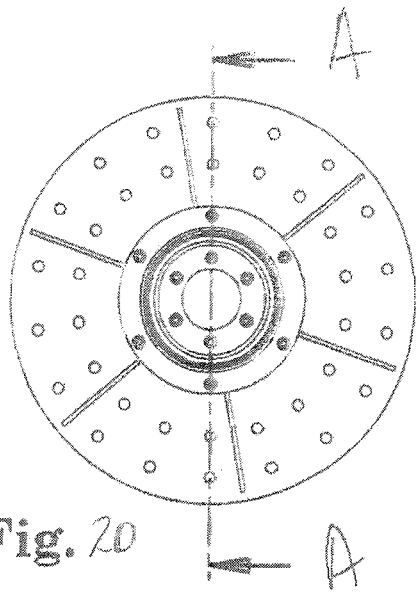
FIG. 20 is a front plan view of the hub in FIG. 18.
Figure 21:
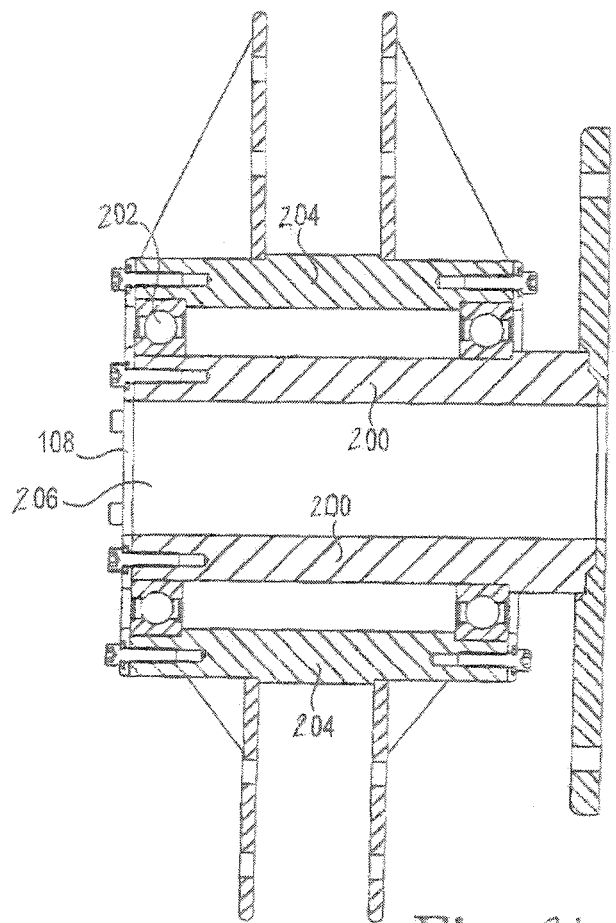
FIG. 21 is a sectional view of FIG. 20 along line A-A.
Figure 22:
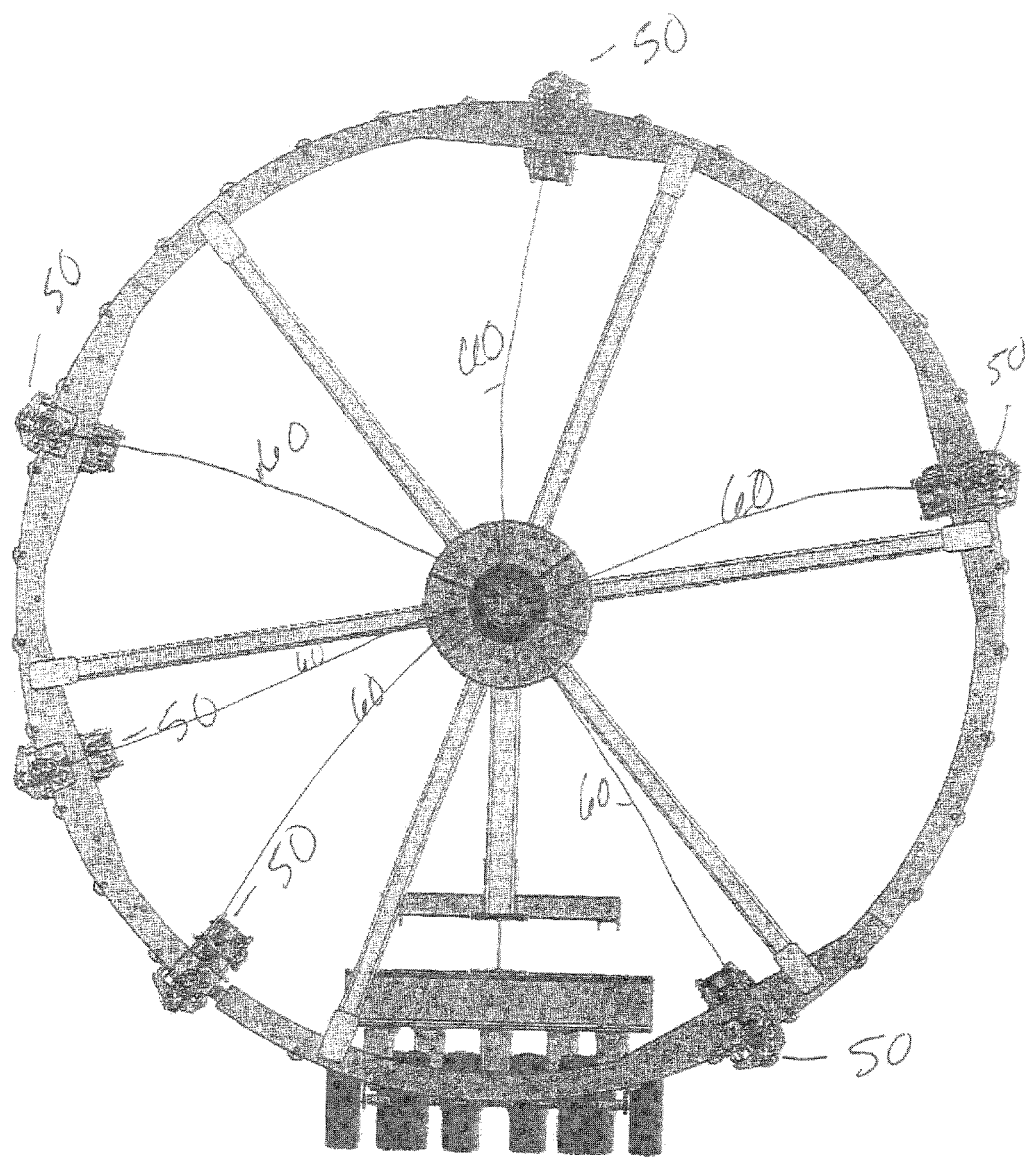
FIG. 22 is a front plan view of the system in FIG. 15 showing gear boxes and power supply lines.

The mobile pipe lining apparatus 1 of the present invention comprises a lining machine 2, a carriage 10, and adjusting means for adjusting a position of the lining machine 2 relative to the carriage 10. The lining machine 2 may have any of various shapes corresponding to a damaged pipe K. Examples include, but are not limited to, circular, rectangular or oblong shaped lining machines 2, as generally depicted in FIGS. 1 and 16, for example, or lining machines having generally those shape characteristics. Further, the carriage 10 may accommodate any of the lining machine 2 shapes, for example, by utilizing a height adjustment mechanism (described further below).

Referring to the embodiment shown in FIG. 1, the lining machine 2 comprises a forming frame 3 including a plurality of links 31 and inner rollers 4, and a rail 6.

Referring to FIGS. 4(a) and 4(b), the forming frame 3 has a plurality of links 31 connected to allow the forming frame 3 to rotate. Each link 31 is equipped with an outside link 33 and an inner side link 32, and is arranged by turns.

The outside link 33 is equipped with arm side covers 331 which are parallel to one another, and a connection board 332 which maintains rigidity and extends from the center of one arm side cover 331 to the other arm side cover 331 such that the connection board 332 and the arm side covers 331 together form an "H." A circular shaft hole is established in each end of each arm side cover 331.

The inner side link 32 is equipped with arm side covers 321 which are parallel to one another, and a connection board 322 which maintains rigidity and extends from the center of one arm side cover 321 to the other arms side cover 321 such that the connection board 322 and the arm side covers 321 together form an "H." A circular shaft hole is established in each end of each arm side cover 321.

The position of the circular shaft hole of the inner side link 32 corresponds to that of the outside link 33. In particular, the side arm 321 of the inner side link 32 is arranged inside the arm side cover 331 of the outside link 33 to overlap therewith such that the axial centers of the shaft holes align. A shaft 34 is inserted through bearings 35 and the shaft holes. The inner side link 32 is equipped with a stop 36 to an indent 37 on arm side cover 331, and restricts movement of the outside link 33 with respect to the inner side link 32 to prevent accordion like folding.

Each shaft 34 of the forming frame 3 is equipped with an inner roller 4. Thus, the shaft 34 is supported so that the plurality of inner rollers 4 can rotate on the forming frame 3 about the shaft 34. Each inner roller 4 may be made of a hard synthetic resin or metal. The plurality of inner rollers 4 arranged at the forming frame 3 touches the inside of the strip lining material 100.

The forming frame 3 can be disassembled by removing the connection of an inner side link 32. The assembly within the underground damaged pipe K can be performed by connecting an inner side link 32.

Figure 7:
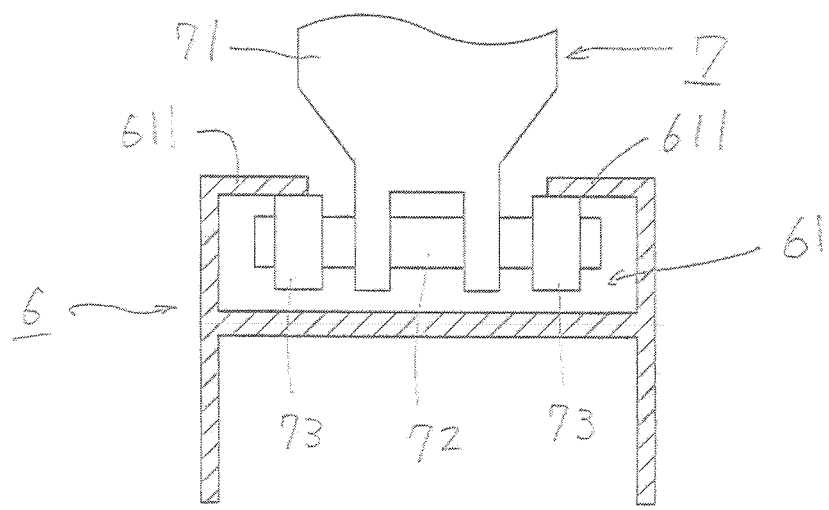
FIG. 7 shows the connection between a connector and a rail of a lining machine.

Referring to FIGS. 1 and 7, a plurality of connectors 7 are formed between the forming frame 3 and the rail 6. The connectors 7 follow a track 611 formed at an outer region 61 of the rail 6 along with the perimeter of the rail 6. For example, as shown in FIG. 7, each connector 7 may comprise a connection mount 71 connected to an axis 72 such that it can rotate on the axis 72. Rollers 73 are mounted on the axis 72 on either side of the connection mount 71 and roll on the track 611 of the rail 6 during winding.

Figure 2:
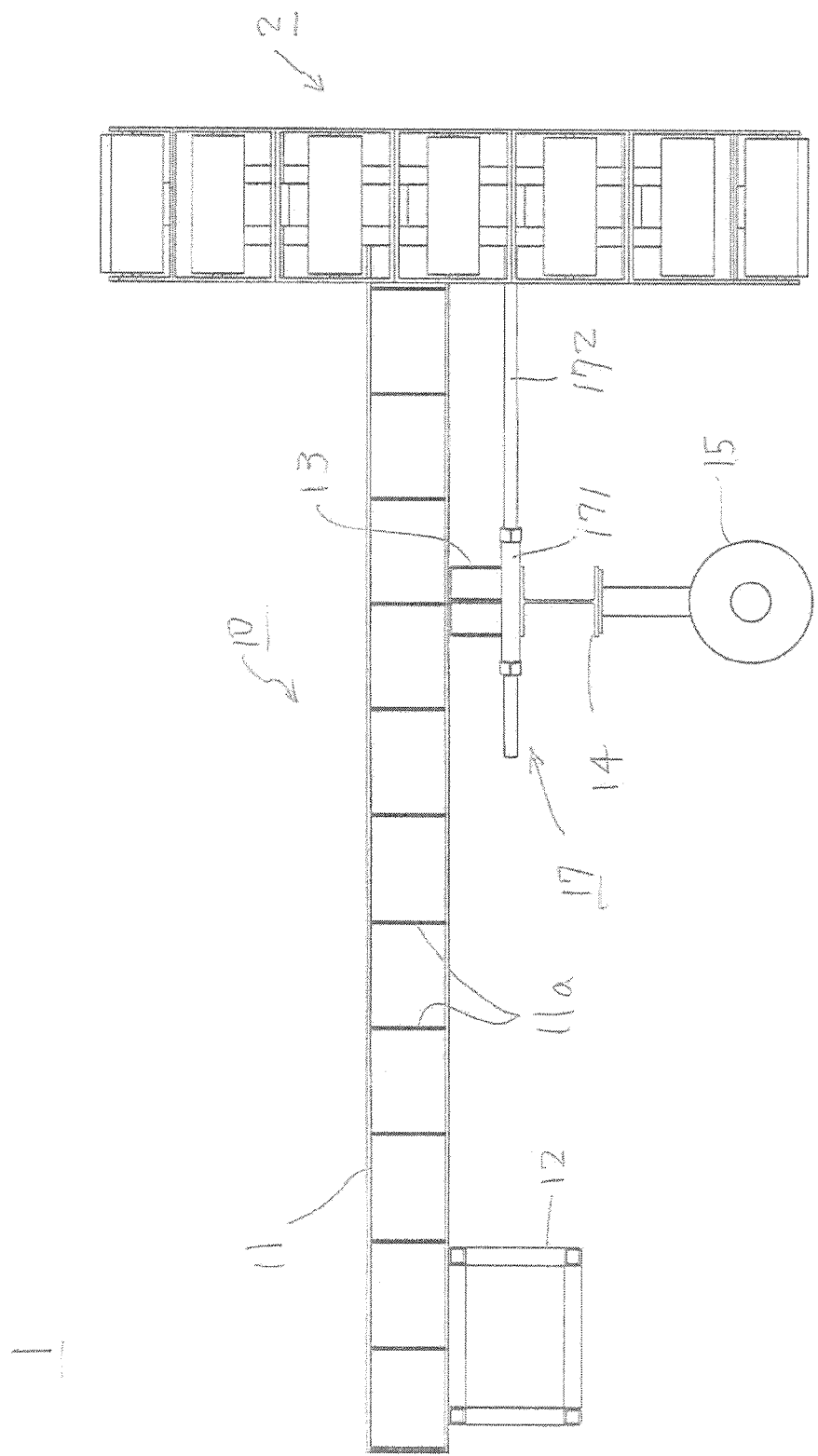
FIG. 2 is a side view of a pipe lining apparatus for installing strip lining material into a host pipe.
Figure 3:
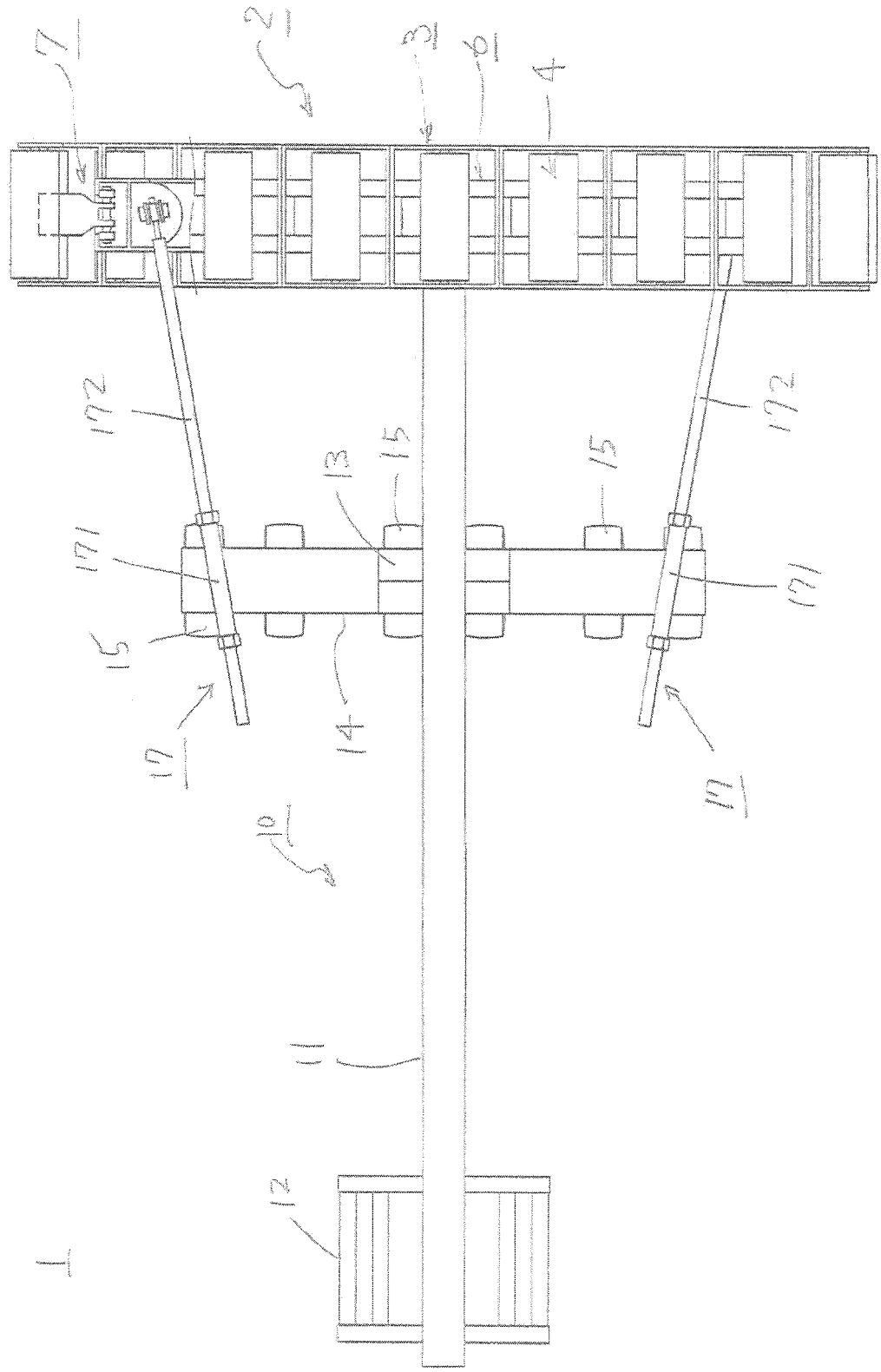
FIG. 3 is a top view of a pipe lining apparatus for installing strip lining material into a host pipe.

Referring to FIGS. 2, 3, and 8, the carriage 10 is attached to the rail 6 of the lining machine 2 such that at least a portion of the weight of the lining machine 2 is borne by the carriage 10. The amount of weight borne by the carriage 10 may be adjusted as conditions warrant, for example, to prevent damage to lining machine 2 resulting from its components bearing too much weight. In some situations it is desirable for carriage 10 to bear all of the weight of lining machine 2 by supporting it in an elevated position above the floor of the pipe K, to facilitate free movement of the apparatus 1, including lean and turn angle adjustments of lining machine 2 relative to carriage 10 and the inner surface of pipe K, thereby allowing controlled movement of lining machine 2 along a consistent centerline of the pipe K.

The attachment between the carriage 10 and the rail 6 may be made via a Heim joint 18 between a connection mount 62 formed on the rail 6 and a connection mount 16 formed on a body 11 of the carriage 10. The body 11 may comprise a top beam having web stiffeners 11a. The Heim joint 18 is a pinned/bolted connection that allows for the position of the lining machine 2 relative to the carriage 10 to be adjusted. For example, the Heim joint 18 allows for the lean angle (forward and back) and/or the turn angle of the lining machine 2 with respect to the carriage 10 to be varied and adjustable. Lean angles may be adjusted in response to changes in slope angle of the pipe K (e.g., upward and downward slopes), turn angles may be adjusted in response to left and right sweeping turns of the pipe K, and both leaning and turning angles may be adjusted as needed in response to various obstacles encountered in the pipe K, such as bumps and deformities of the pipe K wall.

Although a Heim joint 18 is depicted in the figures, it may be appreciated that other joints may be utilized, such as a ball joint rod end, a tie rod end, a swivel joint rod end, or a universal joint, or other suitable flexible attachments allowing secure and stable movement of the lining machine 2 relative to the carriage 10. Furthermore, the height of the Heim joint 18 relative to the body 11, i.e. its vertical position, may be modified and adjusted by replacing the Heim joint 18 with another pinned/bolted connection having a different length of steel tube, for example. Other height adjusters may be utilized, such as a heavy duty pin and hole height adjustment means in connection mount 16 with predetermined adjustment levels, or a hydraulic or mechanical jack mechanism, as examples. By adjusting the height of the Heim joint 18 relative to the carriage 10, various sized and shaped lining machines 2 may be attached to carriage 10 to impart versatility to mobile pipe lining apparatus 1 for a wide variety of application demands, including variable pipe circumferences, for example.

Risers 13 connect the body 11 to wheel mounts 14. Wheels 15 that allow for the carriage 10 to move along a surface of the damaged pipe K are mounted on the wheel mounts 14. However, other means for imparting mobility to the carriage 10 may be utilized in the place of wheels 15, such as tank tracks, or skis that slide along a track, for example.

Figure 15:
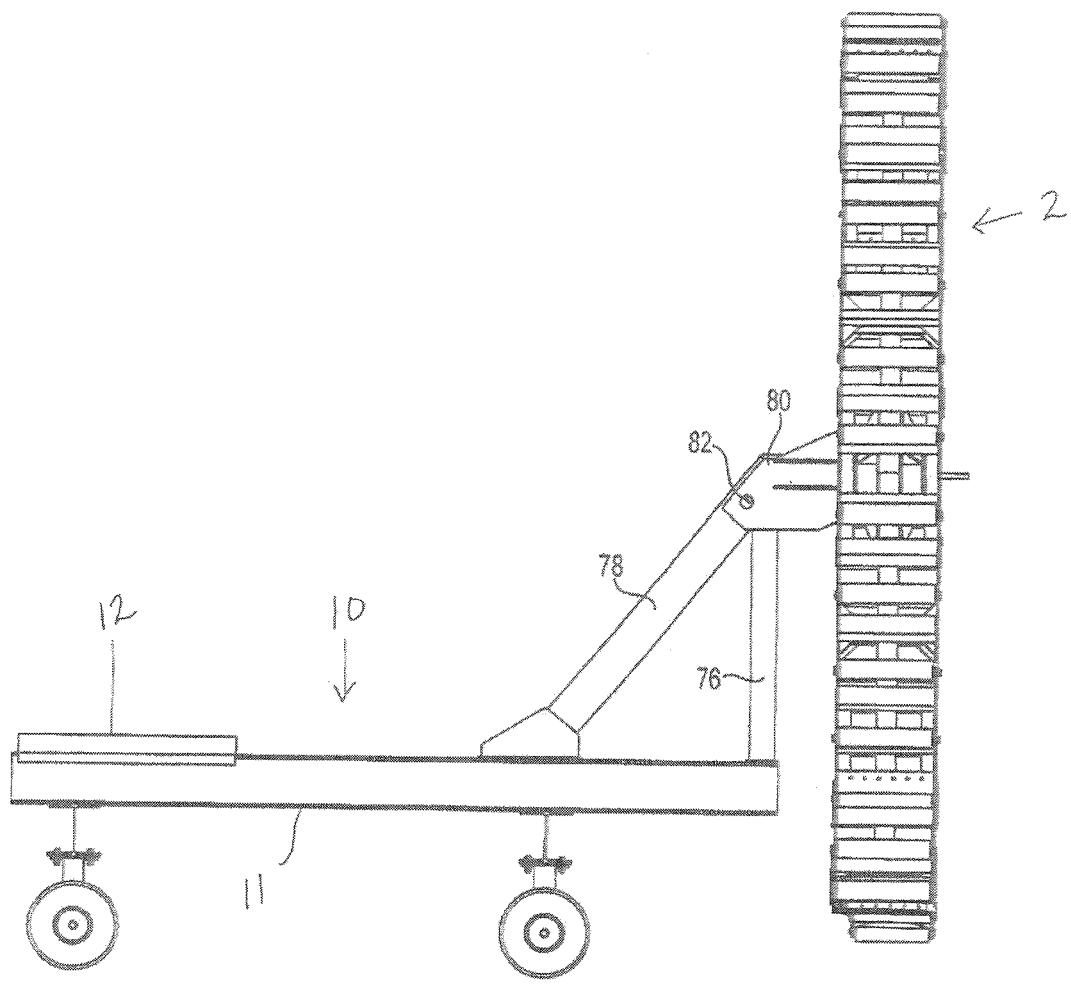
FIG. 15 is a side view of a mobile lining apparatus.

In order to sufficiently distribute the weight of lining machine 2 to prevent damage to the lining machine 2 components, pipe K, or new lining pipe S, for example, the carriage 10 may comprise a weight distributor in the form of wheels 15 attached to the carriage 10. A test can be performed on lining pipe S to determine a threshold load of pressure (e.g., pounds per square inch) at which lining pipe S will adequately resist damage (e.g., lining strips not pulling apart, cracking, deforming, etc), and a weight distribution area, defined by the contact area of the wheels, can be calculated to ensure the determined threshold is not reached or surpassed in relation to the total weight of apparatus 1 with appropriate lining machine 2 attached. To adjust the weight distribution area, wheels can be added or subtracted from the apparatus, or their individual size may be changed, for example. Furthermore, the location of the wheels 15 in relation to the carriage may be adjusted as necessary to more evenly distribute the weight. Although the embodiment depicted in FIG. 2 and FIG. 3 shows one location for a set of wheels 15, multiple locations and sets of wheels 15 can be utilized, as generally shown in FIG. 15, for example.

The body 11 may also comprise a weight holder 12 for holding weighted objects W to counterbalance a weight of the lining machine 2. For example, the weight holder 12 may be arranged under the body 11 as shown in FIG. 2 or on top of the body 11 as shown in FIG. 15. This is useful, for example, to prevent apparatus 1 from tipping over due to the unbalanced weight of lining machine 2, and to impart extra stability to apparatus 1 in response to the forces exerted on it from the strip liner 100 being fed into lining machine 2. Furthermore, by adjusting the amount of weight in weight holder 12, various sized lining machines 2 of different weights may be attached to carriage 10 without need for utilization of larger and smaller carriages, for example. This imparts versatility to carriage 10 for use in a wide variety of pipes K having varying diameters and other characteristics.

When a set of wheels 15 are configured as a pivot point for apparatus 1, weight holder 12 may also be used as a control for adjusting the angle of lining machine 2 relative to the interior surface of pipe K when the lean angle of the lining machine 2 is fixed, or be used to adjust the lean angle of lining machine 2 relative to carriage 10 when the lining machine 2 is allowed to freely lean or tilt forward and back by swinging on Heim joint 18. Control is imparted by adjusting the amount of counterbalance weight of weighted objects W in weight holder 12 relative to the weight of lining machine 2. This allows additional control over the orientation of lining machine 2 with respect to variably sized and contoured pipes K in order to ensure a stable centerline, such as in response to rising or falling slopes or obstacles present in the pipe K, for example. Furthermore, stability is imparted to the lean/tilt movement of lining machine 2 when the connection mount 62 (i.e., attachment point) is positioned above the geometric center of the lining machine 2, as depicted in FIG. 1, for example.

In the embodiment shown in FIGS. 1-3, 9, and 11, the adjusting means comprises the Heim joint 18 between the connection mounts 16 and 62 and adjustable stabilizers 17. Each adjustable stabilizer 17 may comprise a bar 172 mounted to the wheel mount 14 via a fixed stabilizer mount tube 171. The fixed stabilizer mount tube 171 may be a round structural tube or pipe that has an internal diameter between 1.5 in. and 2 in. and a minimum wall thickness of ⅛ in, and the bar 172 may comprise a Ø1 ½-4 ACME® threaded rod. Two Ø1 ½-4 ACME® threaded nuts are threaded on the bar 172, with one being located at the front side of the fixed stabilizer mount tube 171 and one being located at the back side of the fixed mount stabilizer tube 171. As shown in FIG. 9, a female Heim joint 18 may be arranged at one end of the bar 172 and welded to the bar 172 to connect to the rail 6 of the lining machine 2 via a connector 63 comprising connection tabs 631. The connector 63 and the connection tabs 631 may be fabricated from ⅜ in.-½ in. A36 steel plate.

Each fixed mount stabilizer tube 171 is semi-permanently mounted to the corresponding wheel mount 14, for example, by "tack" welding tube 171 in place. The location and positioning of the fixed mount stabilizer tubes 171 is determined in consideration of the design of the lining machine 2 attached to the cart 10. The fixed mount stabilizer tubes 171 may be relocated and positioned for each project.

To adjust an adjustable stabilizer 17, a worker loosens the ACME® threaded nuts and then adjusts the bar 172 to the desired location. Once the bar 172 is in place, the worker tightens both ACME® threaded nuts down on to the fixed mount stabilizer tube 171. By doing so, the ACME® threaded nuts pinch the fixed mount stabilizer tube 171 in place against the bar 172.

The adjustable stabilizers 17 are arranged to be horizontal (i.e., parallel to the ground) and hold the lining machine 2 steady during winding. The triangular setup of the adjustable stabilizers 17 shown in FIG. 3 helps to keep the lining machine 2 centered and eliminate side-to-side shifting while also providing the lining machine 2 with greater turning and pitch ability. The amount of turn and lean are limited by the free movement of the Heim joints 18 at their connection points and the length of the screw rods of the Heim joints 18. All of the Heim joints 18 of the mobile pipe lining apparatus 1 are designed to allow maneuverability around/over small obstacles encountered during the winding process.

Height adjustment of the lining machine 2 is controlled by the height of the connection mount 16 and the risers 13. The amount of turn and lean of the lining machine 2 are limited by the free-range movement of the Heim joints 18 at their connection points and the length of the bars 172 being used. By alternating the placement of the bars 172, slight adjustments to the winding direction of the lining machine 2 as it pertains to the carriage 10 can be made. In a fixed setup, this will allow the machine to progress around long sweeping turns, as shown, for example, in FIG. 11. Lean or pitch adjustments may be made by extending/retracting the adjustable stabilizer bars 17 by the same incremental adjustments on each side. The pivot point for these adjustments is the main Heim joint 18 connection to the rail 6. Because the adjustable stabilizer bars 17 are held at fixed locations by the stabilizer mount tube 171 on the wheel mount 14, the screw rods of the respective Heim joints 18 may be allowed to bend a certain amount without permanent deformation. The permissible bend allowance is determined by the manufacturer of the screw rod and the material used in the construction of the threaded rod. This material may, for example, be an Ø1 ½-4 ACME® threaded rod made from a low carbon steel. Other than the adjustable stabilizers 17 depicted, other means for adjusting the turn and/or lean angle of lining machine 2 may be appreciated, such as pneumatic or hydraulic jacks or cylinders, for example.

FIGS. 12(a) and 12(b) are end elevations showing interlocking of strip lining materials. The strip lining material 100 is a long flexible strip having the shape of a tie plate and consists of materials, such as polyvinyl chloride, polyethylene, and polypropylene, which are extruded and molded.

The lining material 100 has two or more ribs 102. In the embodiment shown in FIGS. 12(a) and 12(b), each rib 102 comprises a cross-sectional "T"-shaped part. The top of the "T" of each rib 102 is formed parallel to a body 101 of the strip lining material 100. The strip lining material 100 further comprises a joint rib 103 and a joint socket 105 at respective side edges thereof. The joint rib 103 can join with a joint socket of an adjacent portion of the strip lining material 100 to form a junction, and the joint socket 105 can join with a joint rib of an adjacent portion of the strip lining material 100 to form a junction.

The joint rib 103 is formed in one side edge (i.e., right side of FIGS. 12(a) and (b)) of the body 101. The joint socket 105, which is configured to receive a joint rib 103 of another strip lining material 100, is formed at the opposite side edge (i.e., left side of FIGS. 12(a) and (b)) of the body 101.

The joint socket 105 is adjoined to an adjacent portion of the strip lining material 100, and an inclination rib 106 is formed adjacent thereto. On the other side of the joint socket 105, a concave portion 104 is formed in the inside side of the body 101. That is, the concave portion 104 is a dent in the body 101. When joining adjacent portions of a strip lining material 100, the body 101 of the adjacent portion of the strip lining material 100 is arranged on the concave portion 104 of a first portion of the strip lining material 100, and the joint rib 103 of the adjacent portion of the strip lining material 100 is interlocked with the joint socket 105 of the first portion of the strip lining material 100. The strip lining material 100 is supplied to the lining machine 2 so that the rib(s) 102 is arranged to be on the outside.

The strip lining material 100 is wound spirally such that one side edge of a strip lining material 100 and the other side edge of the strip lining material 100 adjoin mutually. More specifically, a joint rib 103 of a strip lining material 100 is inserted into the joint socket 105 of an adjacent portion of the strip lining material 100 and is interlocked. Referring to FIG. 12(b), the side edges of the adjacent portions of the strip lining material 100 are interlocked with one another, and a lining pipe having a predetermined diameter is produced. At this time, the joint rib 103 of the following portion of the strip lining material 100 and the side edge of a body 101 of the following portion of the strip lining material 100 are arranged at the concave region 104 of the present portion of the strip lining material 100. The inclination rib 106 of the following portion of the strip lining material 100 fits into the "T" of the rib 102 of the present portion of the strip lining material 100 when the joint rib 103 of the present portion of the strip lining material 100 is interlocked with the joint socket 105 of the following portion of the strip lining material 100.

Figure 13:
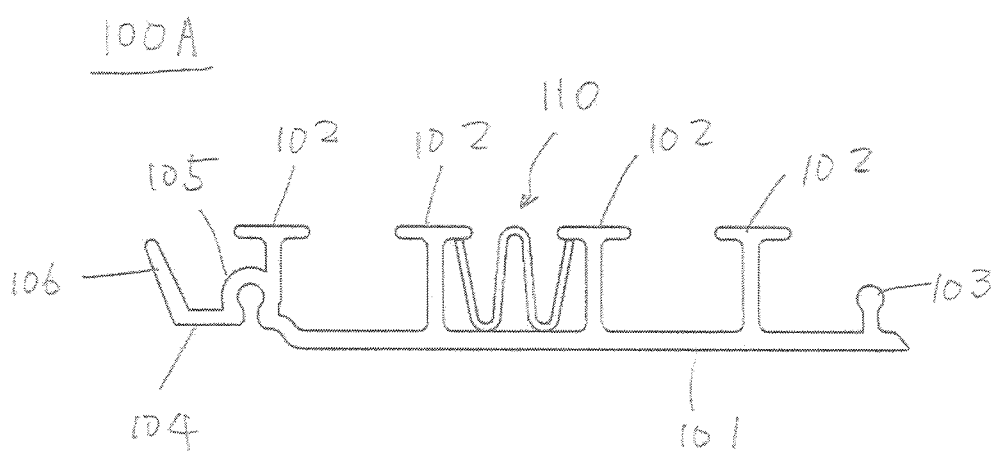
FIG. 13 is a sectional drawing of a strip lining material.

In another embodiment of the present invention, the lining material which constitutes the lining pipe may be a strip lining material 100A comprising a W-shaped member 110 to maintain an upright position of the ribs 12, as shown in FIG. 13.

In still another embodiment of the present invention, the lining material which constitutes the lining pipe may be a strip lining material 100B that is interlocked with itself through a connector 130, as shown in FIGS. 14(a) and 14(b). FIG. 14(a) is sectional drawing showing a strip lining material 100B, and FIG. 14(b) is a junction of a strip lining material 100B, and a perspective diagram of a connector 130.

The strip lining material 100B comprises a connector 130 that interlocks the side edges of adjacent portions of the strip lining material 120. The strip lining material 120 comprises two or more ribs 122 protruding from a body 121, and is formed by extruding and molding. A concave junction 123 is formed at each side edge of the strip lining material 120 along the longitudinal axis. When side edges of adjacent portions of the strip lining material 120 are joined to each other by winding, a junction 123 of a first portion of a strip lining material 120 and an opposite junction 123 of a second portion of the strip lining material 120 are arranged adjacent to one another to create a convex form. The connector 130 has a pair of joint ribs 131. The pair of joint ribs 131 is formed along the longitudinal axis of the lining material 130. The joint ribs 131 have a form corresponding to the convex form of the adjacent junctions 123 of adjacent portions of the lining material 120. The strip lining material 120 adjoins mutually in a lining pipe process, and the connector 130 is inserted at the junctions 123, thereby interlocking the strip lining material 120 to form a strip lining material 100B.

Figure 23:
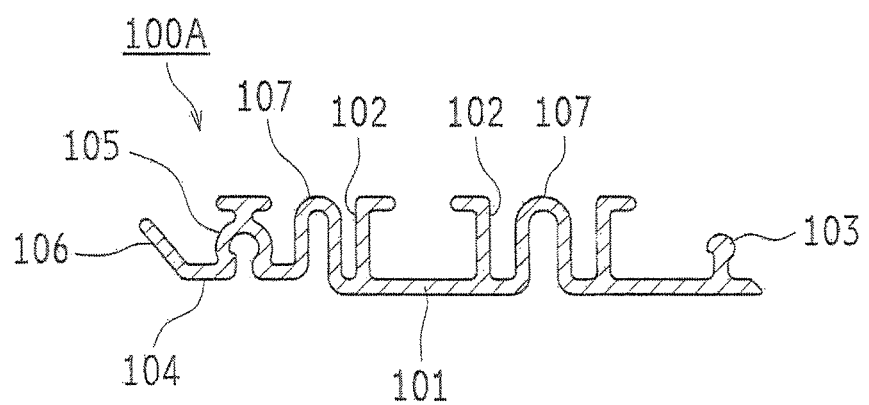
FIG. 23 is a sectional drawing of a strip lining material.

In still another embodiment of the present invention, the lining material which constitutes the lining pipe may be a strip lining material 100A having expanding/contracting portions 107, as shown in FIG. 23.

Figure 5:
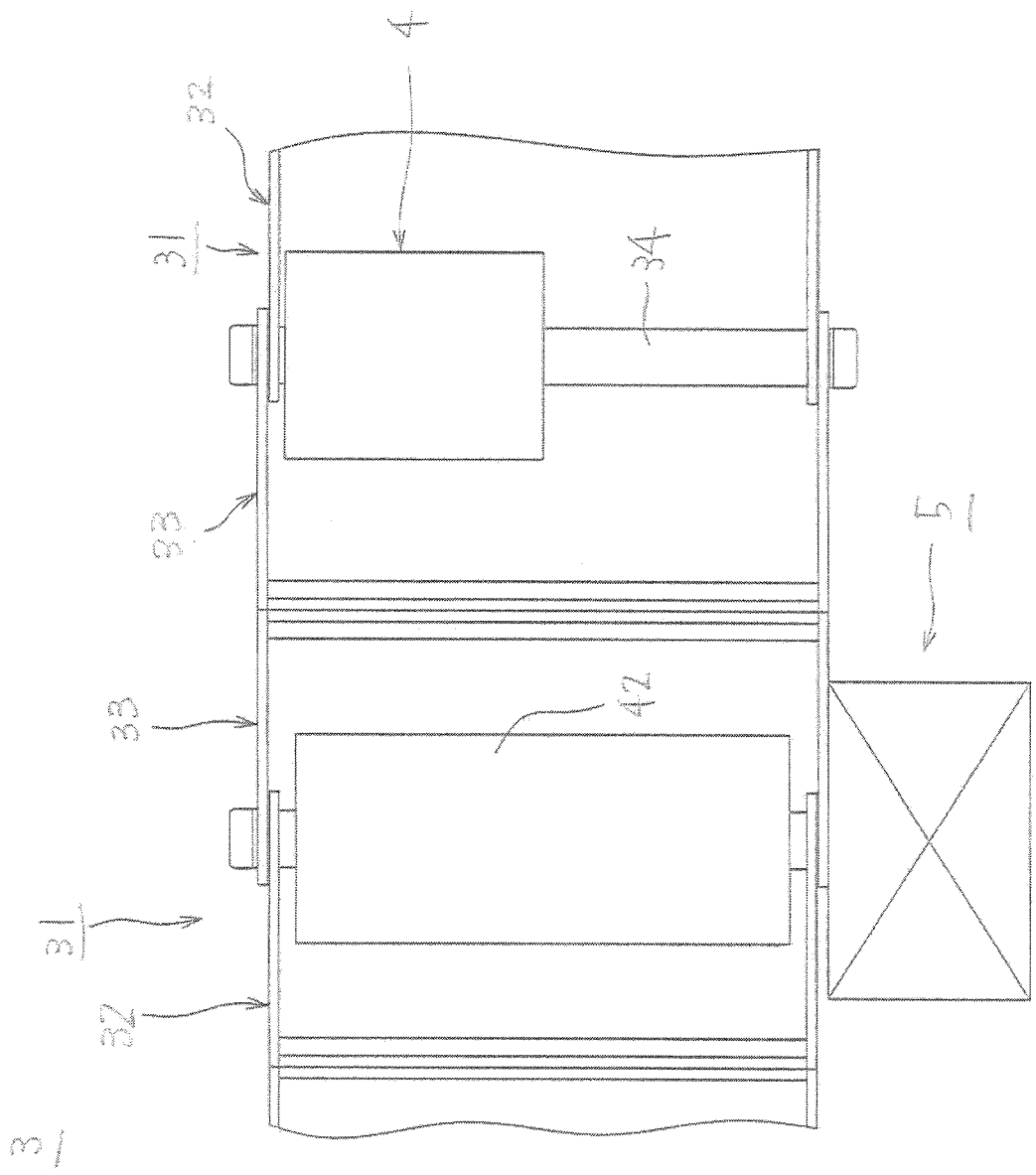
FIG. 5 is a perspective view of a pipe lining apparatus.
Figure 6:
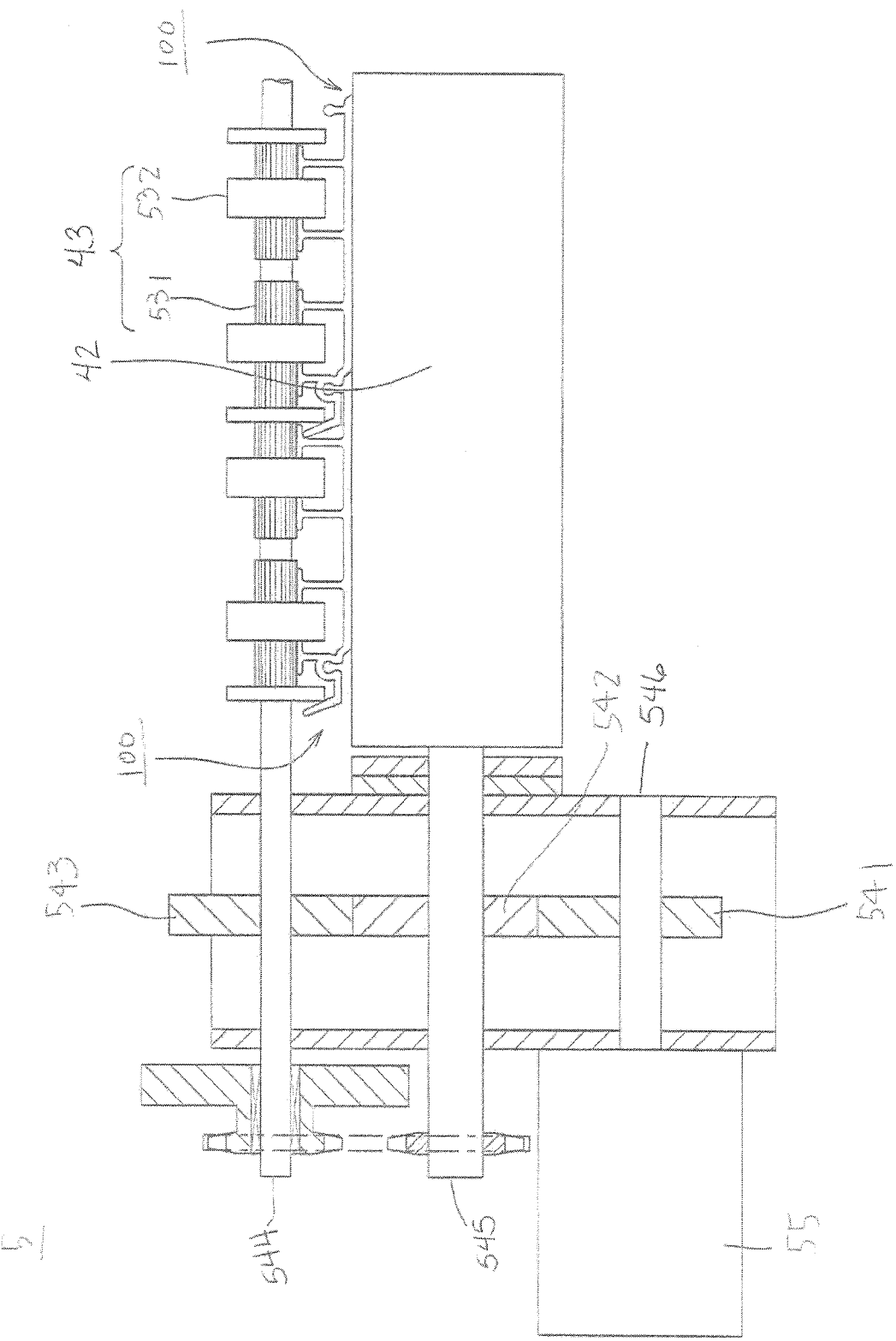
FIG. 6 is a sectional side elevation and is showing a part of a joint mechanism of a pipe lining apparatus.

Referring to FIGS. 1 and 5, a gear box 5 is fixed to the forming frame 3 in a position corresponding to inner roller 42. Referring to FIG. 6, the gear box 5 holds the shafts 544, 545, 546 of gear mechanics and a motor, for example, an electric or hydraulic motor 55, is attached to the front part of the gear box 5 to drive the driven inner roller 42.

Shafts 544, 545, 546 comprise gears 543, 542, and 541, respectively. The inner roller 42 is connected with the second shaft 545, and the second shaft 545 rotates in a direction opposite to the direction of rotation of the first shaft 544. The third shaft 546 rotates in the same direction as the first shaft 544.

The outer roller 43 has two or more annular flanges 532 arranged along a shaft 544. The annular flange 532 fits into a slot between the ribs 102 of a lining strip material 100. Some annular flanges 532 are formed to be smaller in diameter than annular flanges 532. An annular flange 532 is inserted in the outside of the socket 105 of a strip lining material 100 such that it presses the inclination rib 106 of the strip lining material 100 to hook the inclination rib 106 to the rib 102 of a following portion of the strip lining material 100. Moreover, the outer roller 43 may comprise segments of compression rings 531 in regions corresponding to the ribs 102.

The inner roller 42 and the outer roller 43 rotate oppositely and simultaneously to feed the strip lining material 100 which passes between the inner roller 42 and the outer roller 43. The rotation of shafts 544, 545, and 546 and the rotation of the inner roller 42 and the outer roller 43 can be adjusted by adjusting the number of teeth of the gears 543, 542, 541.

FIGS. 15-22 show another embodiment of the lining machine 2 of the present invention. As shown in FIG. 16, the lining machine 2 is generally circular in shape and comprises a forming frame 45 and a central hub 52. The lining machine 2 includes a plurality of profile gear boxes 50 spaced around the forming frame 45. The gear boxes 50 are known in the art as described in U.S. Pat. No. 7,186,060 and used by Sekisui. SPR Americas, LLC of Atlanta, Ga.

In the center of the lining machine 2 is a hollow central hub 52. To supply power to the gear boxes 50, supply lines 60 are fed from a power supply through a central hollow passage 206 to the lining machine 2. The supply lines 60 may be hydraulic fluid, air, or electric lines.

Strip lining material 100 is unspooled and fed into the pipe K to the lining machine 2. Hydraulic gear boxes 50 mounted on the periphery of the lining machine 2 receive the strip lining material 100 and crimp it to the adjacent material already emplaced on the inner surface of the pipe K. Gear boxes 50, which interlink flanges of successive windings of strip lining material 100, rotate around, with lining machine 2, while the crimping action drives the entire mobile pipe lining apparatus 1 forward (in the direction of the arrows shown in FIGS. 10(a) and 10(b)). The supply lines 60 pass through the central hub 52 from the power source to each of the gear boxes 50 through a hydraulic swivel 108 which prevent twisting of the supply lines 60. The mobile pipe lining apparatus 1 therefore creeps along the floor of the pipe K at the rate of relining, either in front of where relining is occurring (as in FIG. 10(a)) or following where relining is occurring (as in FIG. 10(b)). When the mobile pipe lining apparatus 1 creeps along the floor of the pipe K in front of where relining is occurring, there is no need to force the completed relining down the length of the host pipe as it is built. Also, this movement of the pipe lining apparatus 1 prevents the supply lines 60 from getting tangled in the lining. Please note the gear boxes 50 may be configured in the same manner as gear box 5 of the embodiment shown in FIG. 6 and may be employed with strip lining material 100, 100A, or 100B shown in FIGS. 12(a)-(b), 13, and 14(a)-(b).

As with the embodiment shown in FIGS. 2 and 3, the body 11 of the carriage 10 may also be attached to a weight holder 12 for holding weighted objects W to counterbalance a weight of the lining machine 2. The mobile pipe lining apparatus may further comprise a weight distributer, which can carry equipment or a counterweight to balance against the forces of the strip lining material 100. The weight distributor may comprise a set of wheels or may be configured as a pivot point on which the weight of the lining machine 2 is counterbalanced, and may also be used as an extra control over the lean angle and positioning of lining machine 2, as described previously.

As shown in FIG. 15, the body 11 of the carriage 10 is connected to a pair of support arms, one upright support beam 76 and one angled support beam 78 which come together at a joint 80 with a removable cotter pin 82, such as a Heim joint. In this embodiment, the adjusting means comprises the joint 80 and the support beams 76 and 78. Each support beam 76 and 78 may be any rectangular, square, or structural tube that meets the load requirements of the design. Further, each support beam 76 and 78 may be removable and/or allowed to pivot on a hinge at its base, thereby providing for adjustment of the lean angle and/or tilt angle and/or height of the lining machine 2 relative to the carriage 10 via the joint 80. More specifically, each support beam 76 and 78 has a bolted connection at the bottom thereof that provides for the corresponding support beam 76 or 78 to be removable. In addition, the support beams 76 and 78 may be removed and replaced with shorter or longer support beams 76 and 78 as needed to further adjust the position of the lining machine 2 relative to the carriage 10. Moreover, support beam 76 may comprise a hydraulic or mechanical jack, for example, to allow for pitch and height adjustability and the base of support beam 78 may have a pivot type connection. Lean and tilt of the lining machine 2 may be achieved by using a pivoted connection at joint 80 and a mechanical jack device to control/adjust the tilt and/or lean.

The lining machine 2 is adjustably supported in an elevated position above the floor of the pipe k, preferably roughly equally spaced from all sidewalls of the pipe k. The lining machine 2 is constructed for disassembly, with a plurality of curved sections 86, typically quarter round/90 degree segments, bolted together into a circular periphery. Each quarter section has front and back wall plates 88 which are spaced apart by roller spacers 90 and non-roller spacers 92.

At intervals, preferably equally spaced around the periphery, are gear boxes 50, which are used to compressively join adjacent sections of the strip lining material 100. Suitable gear boxes or other forms of compressors exist in the prior art, such as described in U.S. Pat. No. 7,186,060.

The forming frame 45 is connected to a central hub 52 by a plurality of spoke supports 94 which are preferably affixed to central hub 52 at pre-drilled flange(s) 98.

The central hub 52 includes a core section 200 which rides on a bearing 202 within an outer core 204. A central hollow passage 206 is thereby created which allows for passage of supply lines 60. The supply lines 60 may pass through a hydraulic swivel 108 at both ends. Such a swivel is known in the art and available from many suppliers such as Rotary Systems, Inc., Minneapolis, USA, product number 012-N-22212. The hydraulic swivel 108 allows the supply lines 60 to pass through the rotatable central hub 52 without twisting or tangling up. The supply lines 60 in the central hollow passage 206 do not move even when the outer core 204 rotates because of the hydraulic swivel 108.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile pipe lining apparatus for installing strip lining material into a host pipe, comprising:
    a lining machine for receiving a feed of strip lining material and placing it in a host pipe to form a new pipe lining;
    a carriage attached to the lining machine such that at least a portion of the weight of the lining machine is borne by the carriage; and
    adjusting means for adjusting a position of the lining machine relative to the carriage,
    wherein the adjusting means comprises:
    a joint arranged between the carriage and the lining machine, and
    adjustable stabilizers, each adjustable stabilizer comprising a bar extending between the carriage and the lining machine; and
    wherein the carriage comprises:
    a weight holder for holding weighted objects to counterbalance the weight of the lining machine, and
    a weight distributor for distributing the weight of the forming frame and the weighted objects over a defined surface area sufficient to prevent damage to the new pipe lining, the weight distributor being configured as a pivot point on which the weight of the lining machine and the weight of the weighted objects are counterbalanced.

2. The apparatus of claim therein the adjusting means adjust a lean angle of the lining machine relative to the carriage.

3. The apparatus of claim 1, wherein the adjusting means adjust a turn angle of the lining machine relative to the carriage.

4. The apparatus of claim 1, wherein the adjusting means adjust a height of the lining machine relative to the carriage.

5. The apparatus of claim 1, wherein the weight distributor comprises a set of wheels.

6. The apparatus of claim 1, wherein the lining machine is generally rectangular in shape.

7. The apparatus of claim 1, wherein the lining machine is generally circular in shape.

8. The apparatus of claim 7, wherein the lining machine further comprises a huh rotatably attached to the carriage and a swivel unit in the hub.

9. The apparatus of claim 8, wherein the apparatus further comprises power lines for powering the operation of one or more components of the lining machine, and wherein the power lines pass through the swivel unit and the swivel unit remains in a relatively static position during rotation of the hub.

10. A mobile pipe lining apparatus for installing strip lining material into a host pipe, comprising:
    a lining machine for receiving a feed of strip lining material and placing it in a host pipe to form a new pipe lining;
    a carriage attached to the lining machine such that at least a portion of the weight of the lining machine is borne by the carriage; and
    adjusting means for adjusting a position of the lining machine relative to the carriage,
    wherein the carriage comprises:
    a weight holder for holding weighted objects to counterbalance the weight of the lining machine, and
    a weight distributor for distributing the weight of the forming frame and the weighted objects over a defined surface area sufficient to prevent damage to the new pipe lining, the weight distributor being configured as a pivot point on which the weight of the lining machine and the weight of the weighted objects are counterbalanced.

11. The apparatus of claim 10, wherein the adjusting means adjust a lean angle of the lining machine relative to the carriage.

12. The apparatus of claim 10, wherein the adjusting means adjust a turn angle of the lining, machine relative to the carriage.

13. The apparatus of claim 10, wherein the adjusting means adjust a height of the lining machine relative to the carriage.

14. The apparatus of claim 10, wherein the weight distributor comprises a set of wheels.

15. The apparatus of claim 10, wherein the lining, machine is generally rectangular in shape.

16. The apparatus of claim 10, wherein the lining machine is generally circular in shape.

17. The apparatus of claim 16, wherein the lining machine further comprises a hub rotatably attached to the carriage and a swivel unit in the hub.

18. The apparatus of claim 17, wherein the apparatus further comprises power lines for powering the operation of one or more components of the lining machine, and wherein the power lines pass through the swivel unit and the swivel unit remains in a relatively static position during rotation of the hub.

* * * * *